(12) United States Patent
Menig et al.

(10) Patent No.: US 6,289,332 B2
(45) Date of Patent: *Sep. 11, 2001

(54) INTEGRATED MESSAGE DISPLAY SYSTEM FOR A VEHICLE

(75) Inventors: Paul M. Menig, Tigard; Richard A. Bishel, Beaverton, both of OR (US); Goetz Renner, Esslingen (DE); Nicolae Ghitea, Jr., Tigard, OR (US); Chris Kirn; Jared A. Powell, both of Portland, OR (US); Peter Charles Brandt, Lake Oswego, OR (US)

(73) Assignee: Freightliner Corporation, Portland, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,878

(22) Filed: Mar. 18, 1999

Related U.S. Application Data

(60) Provisional application No. 60/122,167, filed on Feb. 26, 1999.

(51) Int. Cl.[7] .............................. G05D 1/00; G06F 7/00; G06F 17/00; G06F 19/00
(52) U.S. Cl. .................................. 707/1; 701/29; 701/30; 701/31; 701/33; 701/36; 340/435; 340/438; 340/439; 340/440; 340/441; 340/903; 180/167; 180/169; 342/69; 342/70; 342/72
(58) Field of Search .................................. 701/1, 29, 30, 701/31, 33, 36; 340/903, 435, 439, 440, 441, 438; 180/169, 167; 342/70, 72, 69

(56) References Cited

U.S. PATENT DOCUMENTS

| | | |
|---|---|---|
| 3,665,383 | 5/1972 | Fales .................................. 340/52 F |
| 3,798,596 | 3/1974 | Sumiyoshi et al. .................. 340/52 F |
| 3,852,712 | 12/1974 | Hynes ................................. 340/52 F |
| 3,987,439 | 10/1976 | Spaniola ................................. 340/413 |
| 4,053,868 | 10/1977 | Cox et al. ........................... 340/52 F |
| 4,072,924 | 2/1978 | Pomerantz .......................... 340/52 F |
| 4,090,194 | 5/1978 | Kosuge ................................. 340/414 |
| 4,258,421 | 3/1981 | Juhasz et al. ......................... 364/424 |
| 4,287,503 | 9/1981 | Sumida .............................. 340/52 F |
| 4,356,470 | 10/1982 | Kogawa et al. ..................... 340/52 F |
| 4,400,779 | 8/1983 | Kosuge et al. ......................... 364/444 |
| 4,475,380 | 10/1984 | Colovas et al. ......................... 73/114 |
| 4,502,124 | 2/1985 | Grohmann et al. .................. 364/442 |
| 4,533,962 | 8/1985 | Decker et al. ............................. 360/5 |
| 4,564,905 | 1/1986 | Masuda et al. ...................... 364/424 |
| 4,570,226 | 2/1986 | Aussedat .............................. 364/442 |

(List continued on next page.)

OTHER PUBLICATIONS

Sayer, *First Committee Draft of SAE J2399*, pp. 1–16, Sep. 9, 1998.

*CELECT RoadRelay™—User's Guide*, Cadec Systems, Inc., Londonderry, NH, pp. 1–32, 1993.

(List continued on next page.)

Primary Examiner—William A. Cuchlinski, Jr.
Assistant Examiner—Ronnie Mancho
(74) Attorney, Agent, or Firm—Klarquist Sparkman Campbell Leigh & Whinston LLP

(57) ABSTRACT

An integrated message system for a vehicle provides an extendable, prioritized message scheme. Using this scheme, the message system acts as a centralized message provider for variety of alerts and operating data originating throughout the vehicle. The message system defines a hierarchy of message levels, each having a unique output protocol. The protocol defines attributes associated with messages at a particular level such as textual or graphical message, an auditory alert, as well as the scheme for playing these messages and alerts. The system integrates a variety of subsystems that conventionally have separate driver interfaces such as a collision warning system and an adaptive cruise control system.

22 Claims, 9 Drawing Sheets

U.S. PATENT DOCUMENTS

| | | | |
|---|---|---|---|
| 4,663,718 | 5/1987 | Augello et al. | 364/444 |
| 4,706,083 | 11/1987 | Baatz et al. | 340/825.06 |
| 4,787,039 | 11/1988 | Murata | 364/424.01 |
| 4,845,630 | 7/1989 | Stephens | 364/442 |
| 5,121,112 | 6/1992 | Nakadozono | 340/870.16 |
| 5,148,702 | 9/1992 | Gulick, Jr. | 73/114 |
| 5,173,856 | 12/1992 | Purnell et al. | 364/424.04 |
| 5,189,619 | 2/1993 | Adachi et al. | 364/426.04 |
| 5,241,295 | 8/1993 | Madau | 340/461 |
| 5,303,163 | 4/1994 | Ebaugh et al. | 364/550 |
| 5,309,139 | 5/1994 | Austin | 340/462 |
| 5,327,117 | 7/1994 | Kohsaka | 340/525 |
| 5,347,260 | 9/1994 | Ginzel et al. | 340/438 |
| 5,432,497 | 7/1995 | Briski et al. | 340/525 |
| 5,457,439 | 10/1995 | Kuhn | 340/435 |
| 5,463,370 | 10/1995 | Ishikawa et al. | 340/439 |
| 5,510,776 | 4/1996 | Murphy et al. | 340/825.17 |
| 5,525,959 | 6/1996 | Przybyla et al. | 340/438 |
| 5,529,139 * | 6/1996 | Kurahashi et al. | 180/169 |
| 5,572,428 | 11/1996 | Ishida et al. | 364/461 |
| 5,572,449 | 11/1996 | Tang et al. | 364/565 |
| 5,646,612 | 7/1997 | Byon | 340/903 |
| 5,648,755 | 7/1997 | Yagihashi | 340/439 |
| 5,659,304 * | 8/1997 | Chakraborty | 340/903 |
| 5,661,658 | 8/1997 | Putt et al. | 364/481 |
| 5,678,196 | 10/1997 | Doyle | 455/54.1 |
| 5,693,876 | 12/1997 | Ghitea, Jr. et al. | 73/114 |
| 5,731,977 | 3/1998 | Taniguchi et al. | 364/426.044 |
| 5,748,477 | 5/1998 | Katoh | 364/461 |
| 5,757,268 | 5/1998 | Toffolo et al. | 340/461 |
| 5,764,139 | 6/1998 | Nojima et al. | 340/461 |
| 5,771,007 | 6/1998 | Arai et al. | 340/903 |
| 5,802,545 | 9/1998 | Coverdill | 711/35 |
| 5,839,534 | 11/1998 | Chakraborty et al. | 180/169 |
| 6,009,355 * | 12/1999 | Obradovich et al. | 701/1 |
| 6,025,789 * | 2/2000 | Lane et al. | 340/933 |
| 6,025,796 * | 2/2000 | Crosby, II | 342/701 |

OTHER PUBLICATIONS

Detroit Diesel ProDriver™—Flyer, 1994.

Appendix C, Electronic Dash Display, Feb. 2, 1996.

McGehee, Dingus, and Horowitz, "An Experimental Field Test of Automotive Headway Maintenance/Collision Warning Visual Displays," *Proceedings of the Human Factors and Ergonomics Society 38$^{th}$ Annual Meeting*, 1994, pp. 1099–1103.

Braun, Sansing, and Silver, "The Interaction of Signal Word and Color on Warning Labels: Differences in Perceived Hazard," *Proceedings of the Human Factors and Ergonomics Society 38$^{th}$ Annual Meeting*, 1994, pp. 831–835.

"Operational Testing of Adaptive Cruise Control," *Automotive Engineering International*, Sep., 1998, pp. 63–71.

Clarke, Peter, "Adaptive Cruise Control is About to Take a Spin," *Systems and Software*, Electronic Engineering Times, Oct. 26, 1998.

"EVT–300 Collision Warning System & SmartCruise," Eaton VORAD®, Specification Sheet, 1998.

"EVT–300 Technical Highlights," Eaton VORAD®, Specification Sheet, Collision Warning System, 1998.

"Radar–Based Adaptive Cruise Control for Trucks," *Truck Engineering/Automotive Engineering International*, Nov. 1998, pp. 130–132.

Appendix C, Standard Protocol, pp. 12–19.

Braun, Curt C., Lori Sansing, Robert Kennedy, N. Clayton Silver,"Signal Word and Color Specifications for Product Warnings: An Isoperformance Application," *Proceedings of the Human Factors and Ergonomics Society 38$^{th}$ Annual Meeting*, 1994, pp. 1104–1108.

Detroit Diesel—ProDriver™—User's Manual, Detroit Diesel Corporation, 1994.

"Operating & Error Codes—Fuel–Tach DBF & DB–2 for Electronic Engines," Series 925/205, FloScan Instrument Company, Inc.

Caterpillar Owner's Manual—Caterpillar Driver Information Display, Feb. 1995.

"Joint SAE/TMC Electronic Data Interchange Between Microcomputer Systems in Heavy–Duty Vehicle Applications," 1988–01.

* cited by examiner

FIG. 9
FIRST STAGE DISTANCE ALERT
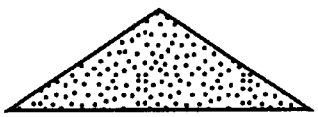
900
SECOND STAGE DISTANCE ALERT
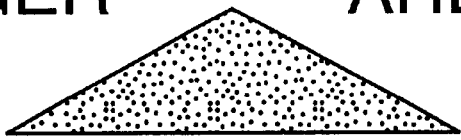
902
THIRD STAGE DISTANCE ALERT
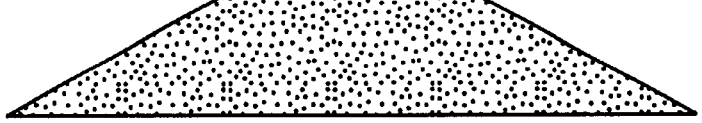
904
DETECT LIGHT
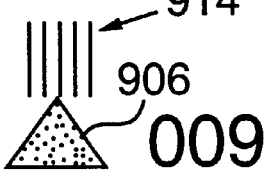
910
CREEP ALERT
908

FIG. 10

| MESSAGE | DISPLAY MESSAGE | DATA BUS MESSAGE | COMMENT |
|---|---|---|---|
| 1 | DANGER AHEAD | 219 226 6 48 8 1 1 140 1 CHKSUM | J1587 PRIORITY 1 |
| 2 | DANGER AHEAD | 219 226 6 48 8 1 1 140 2 CHKSUM | J1587 PRIORITY 1 |
| 3 | DANGER AHEAD | 219 226 6 48 8 1 1 140 3 CHKSUM | J1587 PRIORITY 1 |
| 4 | *NO DISPLAY MESSAGE* RADAR DETECT LIGHT ON | 219 226 6 48 8 1 1 140 4 CHKSUM | J1587 PRIORITY 1 |
| 5 | VEHICLE MOVING SLOW | 219 226 6 48 8 1 1 140 5 CHKSUM | J1587 PRIORITY 1 |
| 6 | SET ALERT/HDWY RANGE <MIN ▨☐☐☐☐☐ MAX> | 219 226 6 48 8 1 1 140 6 CHKSUM | J1587 PRIORITY 2 |
| 7 | SET ALERT/HDWY RANGE <MIN ☐▨☐☐☐☐ MAX> | 219 226 6 48 8 1 1 140 7 CHKSUM | J1587 PRIORITY 2 |
| 8 | SET ALERT/HDWY RANGE <MIN ☐☐▨☐☐☐ MAX> | 219 226 6 48 8 1 1 140 8 CHKSUM | J1587 PRIORITY 2 |
| 9 | SET ALERT/HDWY RANGE <MIN ☐☐☐▨☐☐ MAX> | 219 226 6 48 8 1 1 140 9 CHKSUM | J1587 PRIORITY 2 |
| 10 | SET ALERT/HDWY RANGE <MIN ☐☐☐☐▨☐ MAX> | 219 226 6 48 8 1 1 140 10 CHKSUM | J1587 PRIORITY 2 |
| 11 | SET ALERT/HDWY RANGE <MIN ☐☐☐☐☐▨ MAX> | 219 226 6 48 8 1 1 140 11 CHKSUM | J1587 PRIORITY 2 |
| 12 | SET ALERT/HDWY RANGE <MIN ☐☐☐☐☐☐▨ MAX> | 219 226 6 48 8 1 1 140 12 CHKSUM | J1587 PRIORITY 2 |
| 13 | SET ALERT/HDWY RANGE <MIN ☐☐☐☐☐☐▨ MAX> | 219 226 6 48 8 1 1 140 13 CHKSUM | J1587 PRIORITY 2 |
| 14 | SET ALERT VOLUME <MIN ▨☐☐☐☐☐☐ MAX> | 219 226 6 48 8 1 1 140 14 CHKSUM | J1587 PRIORITY 2 (SETTING AT MINIMUM INCREMENT (0) OF FIXED INCREMENTS (0-7)) |
| 15 | SET ALERT VOLUME <MIN ☐▨☐☐☐☐☐ MAX> | 219 226 6 48 8 1 1 140 15 CHKSUM | J1587 PRIORITY 2 (SETTING AT INCREMENT 1) |
| 16 | SET ALERT VOLUME <MIN ☐☐▨☐☐☐☐ MAX> | 219 226 6 48 8 1 1 140 16 CHKSUM | J1587 PRIORITY 2 (SETTING AT INCREMENT 2) |
| 17 | SET ALERT VOLUME <MIN ☐☐☐▨☐☐☐ MAX> | 219 226 6 48 8 1 1 140 17 CHKSUM | J1587 PRIORITY 2 (SETTING AT INCREMENT 3) |
| 18 | SET ALERT VOLUME <MIN ☐☐☐☐▨☐☐ MAX> | 219 226 6 48 8 1 1 140 18 CHKSUM | J1587 PRIORITY 2 (SETTING AT INCREMENT 4) |
| 19 | SET ALERT VOLUME <MIN ☐☐☐☐☐▨☐ MAX> | 219 226 6 48 8 1 1 140 19 CHKSUM | J1587 PRIORITY 2 (SETTING AT INCREMENT 5) |
| 20 | SET ALERT VOLUME <MIN ☐☐☐☐☐☐▨ MAX> | 219 226 6 48 8 1 1 140 20 CHKSUM | J1587 PRIORITY 2 (SETTING AT INCREMENT 6) |
| 21 | SET ALERT VOLUME <MIN ☐☐☐☐☐☐▨ MAX> | 219 226 6 48 8 1 1 140 21 CHKSUM | J1587 PRIORITY 2 (SETTING AT INCREMENT 7) |
| 22 | *HEADWAY DATA ONLY* | 219 226 8 48 8 2 16 140 eee CHKSUM | J1587 PRIORITY 2 |
| 23 | DRIVING DATA WAS SAVED | 219 226 6 48 8 1 1 140 23 CHKSUM | J1587 PRIORITY 2 ACCIDENT RECONSTRUCT. CONFIRMATION SCREEN |
| 24 | DRIVING DATA NOT SAVED | 219 226 6 48 8 1 1 140 24 CHKSUM | J1587 PRIORITY 2 ACCIDENT RECONSTRUCT. DATA SAVE FAILURE |

INTEGRATED MESSAGE DISPLAY SYSTEM FOR A VEHICLE

RELATED APPLICATION DATA

This application claims priority to co-pending U.S. patent application Ser. No. 60/122,167, filed Feb. 26, 1999, entitled, "Integrated Message Display System for a Vehicle", by Paul Menig, Richard Bishel, Nick Ghitea, Chris Kim, Jared Powell, and Peter C. Brandt, which is hereby incorporated by reference.

TECHNICAL FIELD

The invention relates to audio-visual message displays for vehicles that provide operating, diagnostic, and warning information to the driver.

BACKGROUND

Over the past several years, a variety of vehicle electronics products have been developed to assist drivers, and provide vehicle operating, trip and diagnostic information. This is particularly true in long-haul trucks, where a number of options are available such as collision warning systems, adaptive cruise control, and wireless communication systems. Some collision warning systems use radar to apprise the driver of collision dangers. Adaptive cruise control is an advanced feature of collision warning systems that uses radar and the vehicle's cruise control system to maintain a desired following distance (called "headway"). In addition to these new electronics products, existing components now typically include electronic controls that can provide additional vehicle diagnostic and operating data.

While these electronic products can provide useful information to the driver, they can also overload the driver with information. Even with careful design of displays and indicator lights for each new feature, the driver can easily become overwhelmed by the displays associated with these new products. As such, the driver may ignore, or worse, become distracted by the displays.

SUMMARY OF THE INVENTION

The invention provides an audio-visual message system for a vehicle that receives information about operating conditions from a variety of sources throughout the vehicle and generates visual and auditory outputs via a centralized message center. The system includes an instrumentation control unit that manages the output of alerts through a visual display and audio transducer. The instrumentation control unit receives information about operating conditions from other electronic control units in the vehicle. In response, the instrumentation control unit determines the appropriate messages to generate based on a general, extendable prioritization scheme.

The system prioritizes alerts based on their relative importance. It organizes alerts into levels of importance, where each level has a corresponding visual and auditory alert that distinguishes it from other levels. When an event is detected that triggers an alert, the instrumentation control unit overrides a default screen and plays the corresponding alert. When more than one alert is activated, the instrumentation control unit resolves conflicts based on the priority of each alert.

Another aspect of the invention is the integration of collision warning messages into the system's message scheme. A collision warning system communicates collision warning conditions to the instrumentation control unit. The instrumentation control unit determines whether to override the current message with a collision warning alert based on the relative priority of the alert and the current message. The collision warning alerts use a combination of visual and auditory warnings that grow progressively more intense as the degree of danger of a collision danger increases. This approach eases the driver's workload because the collision alerts are integrated into the instrumentation control unit's message center, which provides a centralized source of information to the driver.

Yet another aspect of the invention is the integration of adaptive cruise control messages into the system's centralized message scheme. The instrumentation control unit prioritizes adaptive cruise control messages in a similar manner as collision warning messages. In particular, it determines whether to override the current message based on the relative priority of the current message and a new adaptive cruise control message. In one implementation, for example, the instrumentation control unit manages the display of three types of adaptive cruise control messages: function set messages, system failure messages, and danger ahead messages. It generates function set messages in response to user input, such as when the driver sets a desired headway for the adaptive cruise control system. It generates system failure messages in response to detecting a failure of some aspect of the adaptive cruise control system. Finally, it generates danger ahead messages in response to collision warning events that occur while the vehicle is in adaptive cruise control mode.

Another aspect of the invention is the integration of transmission messages into the system's centralized message scheme. The instrumentation control unit integrates the display of transmission messages, such as the current gear and mode of the transmission, by displaying this information along with the display of a default screen or an alert screen.

Further features of the invention will become apparent with reference to the following detailed description and accompanying drawings.

BRIEF DESCRIPTION OF THE DRAWINGS

FIG. 5 illustrates the operation of the highest priority alert, a DANGER alert. FIG. 6 illustrates the operation of the next highest priority alert, a WARNING alert. FIG. 7 illustrates the operation of the next highest priority alert, a CAUTION alert. Finally.

FIG. 9 is a diagram illustrating message displays of collision detection warnings integrated into the message center of the instrumentation control unit shown in FIGS. 1 and 3.

FIG. 10 is a table illustrating a list of collision detection display messages and their corresponding priority and data bus message format.

DETAILED DESCRIPTION OF THE INVENTION

System Implementation Overview

Figure 1:
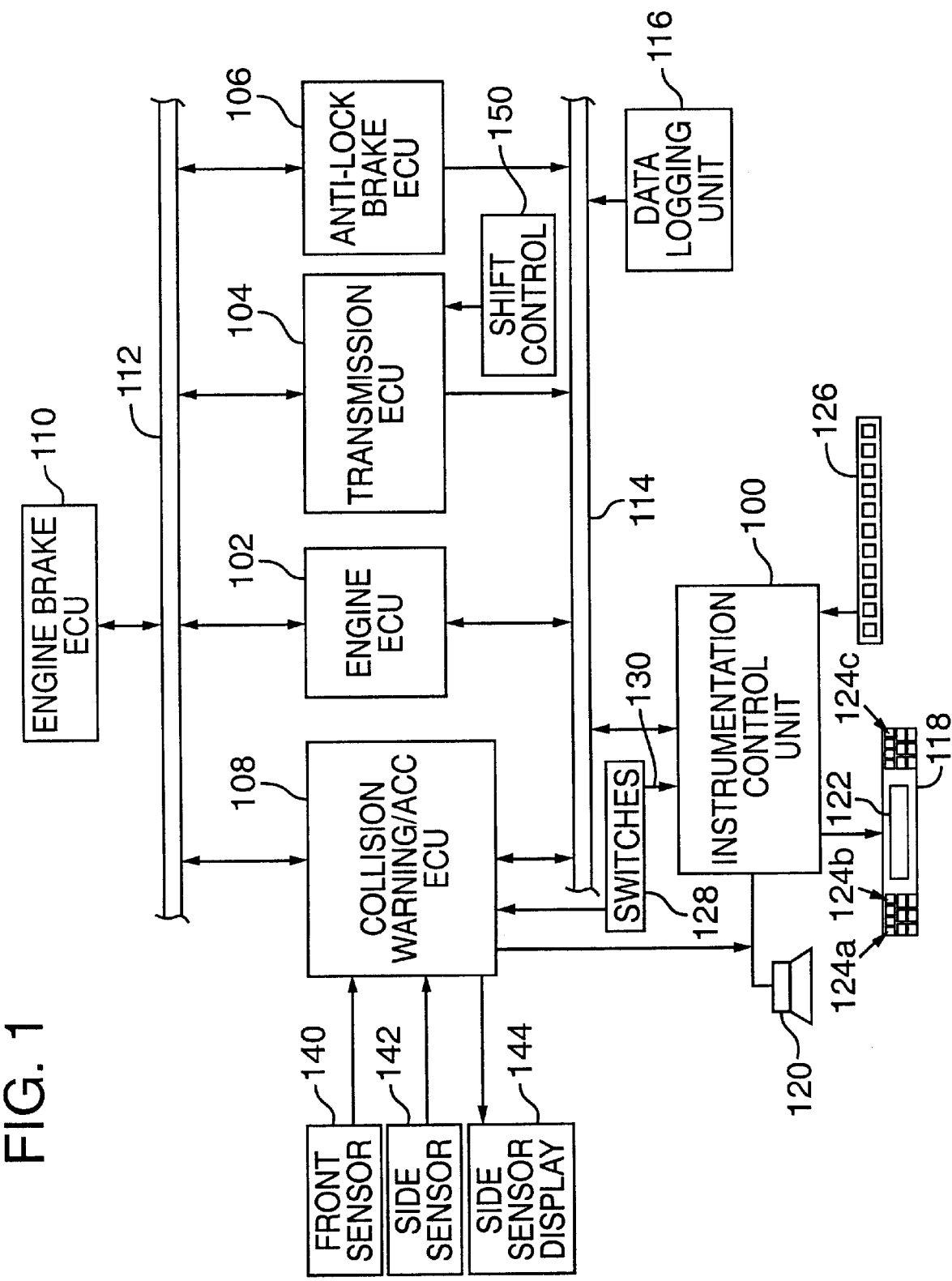
FIG. 1 is a block diagram illustrating an implementation of electronic subsystems and their interconnection with an instrumentation control unit.

FIG. 1 is a block diagram illustrating the system architecture of electronic control units in an implementation installed in a truck. The system architecture includes a number of electronic control units (ECUs, 100–110) interconnected via data links 112, 114. An instrumentation control unit (ICU) 100 located in the dash of the vehicle provides an integrated message center for other subsystems in the vehicle, including the engine ECU 102, transmission ECU 104, anti-lock brake ECU 106, and collision warning ECU 108. In addition, the system includes a data logging unit 116, which monitors messages communicated over the data link and records operating data in response to detecting events.

The integrated message center of the ICU 100 in FIG. 1 includes a visual display 118 and audio transducer (i.e., a speaker) 120 for generating audio-visual alerts. The visual display includes a display screen 122 as well as indicator lights (e.g., 124a–c). The driver can enter input to the ICU via an input device 126 (e.g., a keypad) and, in some implementations, via discrete switches 128 (e.g., rocker switches, push buttons). Switches and other dash controls that impact the operation of the ICU may be wired to the ICU or to other ECUs, or both. For example, a collision warning system and/or adaptive cruise control system may include input switches located on the dash. These switches can be wired directly to the collision warning ECU 108, which in turn communicates input from the switches to the ICU. Conversely, other switches may be wired directly to the ICU, which in turn, communicates input from the switches to another ECU via the data link 114.

The engine ECU 100 shown in FIG. 1, controls and monitors the operation of the engine. Like the other ECUs, the engine ECU includes a programmed data processor and memory for storing computer programs and data. The data processor executes routines stored in the memory to control and monitor engine performance.

The engine ECU also includes a variety of sensors and controls used to monitor and control the engine. One important function of the engine ECU is the control of the throttle. The engine ECU controls the fuel rate by issuing control signals to a fuel injector that controls the flow of fuel to the engine's cylinders.

The ECU includes several sensors that monitor vehicle operating data, including a speed sensor, an RPM sensor, a throttle position sensor and a cruise status sensor. Some vehicle operating parameters are computed from measured data. For example, the engine torque is computed using a mathematical formula that expresses engine torque as a function of measured parameters, including fuel rate and turbo boost pressure.

The engine ECU determines the amount of fuel supplied to the cylinders in the engine by controlling the solenoid valves that inject fuel to the engine cylinders. The rate of fuel flow is directly related to the amount of time that the solenoid valve is closed. This time period determines the volume of fuel injected into a cylinder per revolution. By determining the amount of time that the solenoid valves are closed, the engine ECU can compute the amount of fuel consumed by the engine. The engine ECU calculates the fuel flow rate from the dwell of the injection pulse and the engine speed.

The engine ECU measures the vehicle's road speed. A speed control senses the speed of rotation of the tail shaft of the truck and converts it into road speed. A hall effect sensor located on the tail shaft generates an analog signal comprised of a series of pulses representing the rotation rate of the engine. The engine ECU is programmed to read this digital value and derive the instantaneous speed in miles per hour.

The engine ECU also monitors a variety of other vehicle operating parameters, including RPM, engine torque and throttle position. These parameters are transferred to the ICU 100 over the data link 114.

The transmission ECU 104 controls the truck's transmission. The specific type of ECU varies depending on the transmission vendor, and the type of transmission, e.g., manual, automatic or automated mechanical transmission. Examples of transmission systems that are controlled via ECUs include the Eaton Fuller AutoShift® heavy-duty automated truck transmission and the Meritor SureShift™ transmission system.

The transmission ECU receives driver instructions via a driver interface in the cabin of the truck. One possible implementation of the driver interface is a column mounted shift control 150 that communicates shift command inputs to a transmission ECU. For more information on this type of driver interface, see co-pending patent application Ser. No. 09/258,649, entitled "Lever Assembly for an Electronically Controllable Vehicle Transmission", filed Feb. 26, 1999, by Paul Menig, Michael von Mayenburg, Nasser Zamani, Joseph Loczi, and Jason Stanford, which is hereby incorporated by reference.

The anti-lock brake ECU 106 controls the anti-lock brakes on the truck. Examples of anti-lock brake systems controlled via an ECU include the WABCO ABS from Meritor WABCO Vehicle Control Systems, Bendix AntiLock Systems from Allied Signal Truck Brake Systems Company, and Bosch AntiLock Brake Systems.

The collision warning ECU 108 controls a collision warning system on the truck. The collision warning system (CWS) includes a front sensor 140, side sensor 142, side sensor display 144, and switches 128 (e.g., an ON/OFF switch, volume control, and collision warning range/adaptive cruise headway control). A programmed CPU on the CWS ECU 108 receives information about nearby objects from the front sensor 140 and side sensor 142, computes collision warning conditions, and communicates warnings to the ICU 100. Based on information from the front sensor 140, the CWS ECU 108 measures the range, distance, closing speed, and relative speed to vehicles and other objects in its field of view. For radar-controlled systems, the front sensor 140 is a radar antenna. Other types of sensors may be used as well, such as infra-red sensors. Side sensors 142 located on the side of the truck detect vehicles in the driver's blind spots. In response to detecting an object via the side sensor, the CWS generates a warning indicator on the side sensor display 144.

In addition to providing collision warnings, the CWS ECU 108 operates in conjunction with the engine ECU 102, anti-lock brake ECU 106 and engine brake ECU 110 to provide Adaptive Cruise Control (ACC). Adaptive cruise control is an application of the collision detection system that uses data detected from the front sensor to maintain headway (i.e., the following distance) between the truck and the vehicle in front of it. The ACC system adjusts the vehicle's speed from the "set speed" established for cruise control to maintain a safe following distance from a slower vehicle. To control vehicle speed, the ACC system sends control messages via the J1939 data link to: 1) the engine ECU for throttle control, 2) the engine brake to actuate engine retarder braking, 3) the anti-lock brake system to initiate automatic braking, and 4) the transmission control to downshift the transmission. When the slower vehicle increases its speed or changes lanes, the ACC resumes the speed to return to the desired set speed. For more information on adaptive cruise control, see U.S. Pat. No. 5,839,534, entitled "System and Method for Intelligent Cruise Control Using Standard Engine Control Modes," which is hereby incorporated by reference.

The CWS ECU 108 in the current implementation is part of the EVT-300 collision warning system from Eaton VORAD Technologies, L.L.C. of San Diego, Calif. The ACC functionality is part of the SMARTCRUISE® adaptive cruise control system from Eaton VORAD Technologies. Other collision warning and adaptive cruise control systems may be used in the alternative. One example of an alternative system is the A.D.C. distance control system from A.D.C. ADC adaptive cruise control systems include radar based sensors and infrared based sensors.

The engine brake ECU controls engine braking by controlling the discharge of gases from the engine's cylinders. While shown as a functionally separate unit, the engine brake ECU is typically incorporated into the engine ECU.

The Data Links

The implementation shown in FIG. 1 uses two separate data links 112, 114: 1) a data link 114 designed according to SAE J1708, a standard for serial data communication between microcomputer systems in heavy duty vehicle applications; and 2) a data link 112 designed according to the SAE J1939 Serial Control and Communication Vehicle Network standard. While the current implementation primarily uses the J1708 data link as a shared communication path between the ICU and the other ECUs, it also uses dedicated wiring connections directly between some ECUs and sensors to convey information to the ICU. For alternative implementations, it may also use the J1939 data link to connect the ICU with other ECUs.

The J1708 data link is comprised of a twisted pair cable operating at 9600 baud. The data link forms a communication channel among the electronic control units coupled to it. Electronic control units generate a digital signal on the data link by applying a voltage differential between the two wires in the cable. A voltage differential above a specified threshold represents a logic high value, while a voltage threshold below a specified threshold represents a logic low value. This type of data link is particularly advantageous for hostile environments because the signal is more robust and impervious to signal degradation.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines one format for data and messages communicated among microprocessors connected to a shared data link, and is specifically adapted for use with SAE J1708.

According to SAE J1708/J1587, the ECUs on the data link communicate by passing messages to each other. The ECUs can be either receivers, or receivers and transmitters. In this particular implementation, the instrumentation control unit 100 is both a transmitter and receiver. The engine ECU acts as both a transmitter and receiver as well. As a transmitter, it sends messages to the ICU regarding road speed, fuel rate, engine torque, RPM, throttle position, engine status, etc. It receives messages regarding cruise control functions.

In the J1587 format, a message includes the following: 1) a module ID (MID), 2) one or more parameters, and 3) a checksum. The number of parameters in a message is limited by the total message length defined in the SAE J1708 standard. The message identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs convey information about one or more parameters contained within the messages. According to the SAE J1587 standard, the first character of every parameter is a parameter identification character (PID). The parameter identified by the PID directly follows the PID. The SAE J1587 supports different data formats including a single character, a double data character or more than two data characters representing the parameter data. Several parameters can be packed into a message, limited by the maximum message size as noted above.

Again, in this implementation, the ECUs communicate with each other over one of the data links 114 according to the SAE standard J1708. The standard describes methods for accessing the data link and constructing messages for transfer over it. It also defines a method for resource contention among the ECUs on the data link.

An ECU wishing to transmit data on the data link first waits for a lull in transmission of data on the data link. In this particular implementation, the length of the lull is 200 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases two or more transmitters may attempt to broadcast a message at one time, giving rise to a collision. To resolve a conflict among transmitters, messages have a priority according to their message identifiers. The MIDs of higher priority transmitters have a greater number of bits set at a logic level one. When more than one message is broadcast at a time, the more dominant message takes priority over lesser dominant messages. Since a lower priority message is blocked by a higher priority message, the transmitter of the lower priority message must wait and retransmit the message after another lull. An ECU on the data link will continue to attempt to send a message until it is successfully broadcast to the data link.

The Instrumentation Control Unit

Figure 2:
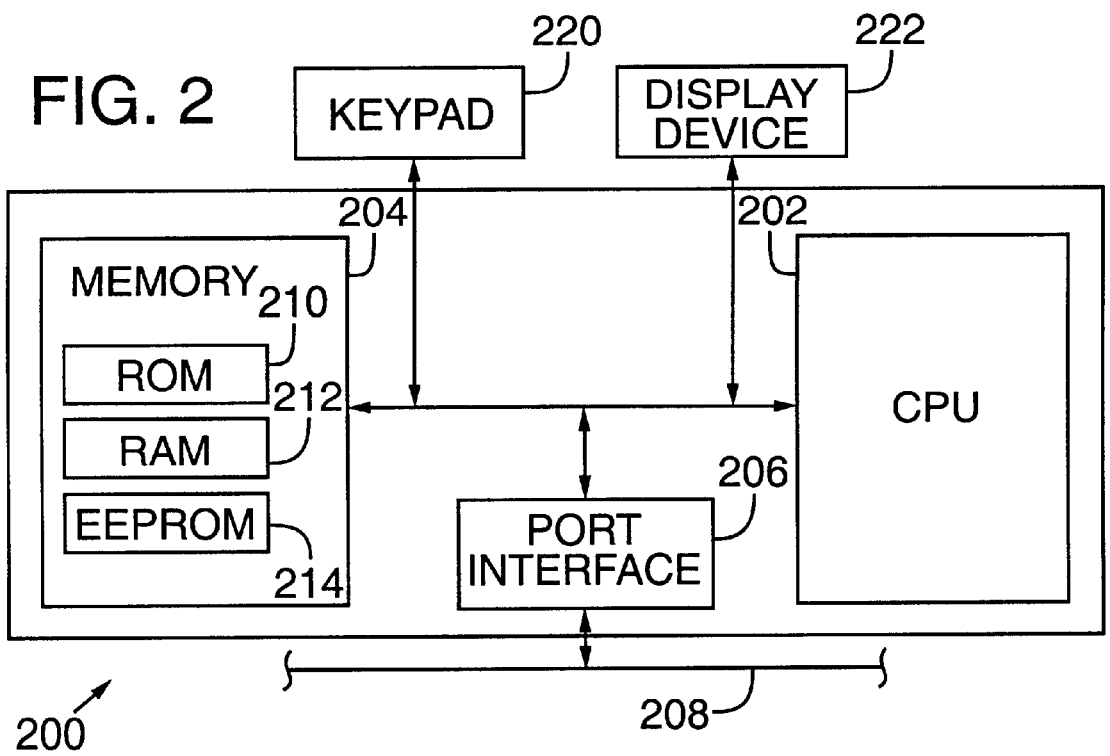
FIG. 2 is a diagram illustrating the instrumentation control unit in FIG. 1.

FIG. 2 is a functional block diagram illustrating the architecture of the ICU 200 shown in FIG. 1. The ICU has a CPU 202, memory 204 and a port interface 206 for connecting the unit to the J1708 data link 208. The memory 204 includes programmable ROM (EEPROM) 210, RAM 212 and permanent ROM 214. The routines for controlling the ICU are stored in ROM 210, while re-configurable data is stored in the EEPROM 214.

In one specific implementation, the ICU has a 68HC16 microprocessor from Motorola Corporation, and its memory configuration 204 includes EEPROM, ROM, and RAM. This specific ICU has 8 KB of external EEPROM, 500K of ROM and 64K of RAM. The internal memory of the ICU includes 1 Mbyte of RAM and 1 Mbyte of ROM. These specifications are unique to the implementation, but will vary from one implementation to the next. A variety of microprocessors and memory systems can be used to implement the functionality of the instrumentation control unit. Preferably, the processor used in the ICU should have at least a 16 bit microprocessor. The speed of the processor can vary, but should be sufficient to manage the message center functions described below within a 200 ms time increment.

The ICU also includes an input device 220 and a display device 222. In the current implementation, the input device is a ten-key keypad. The display device 222 provides a textual and graphical output to the driver. The current implementation of the display device is a two by 20 vacuum fluorescent display.

The ICU used in this implementation is manufactured by Joseph Pollak of Boston, Mass. for Freightliner Corporation, and is available as a replacement part from Freightliner Corporation.

Example of the Dash Layout

Figure 3:
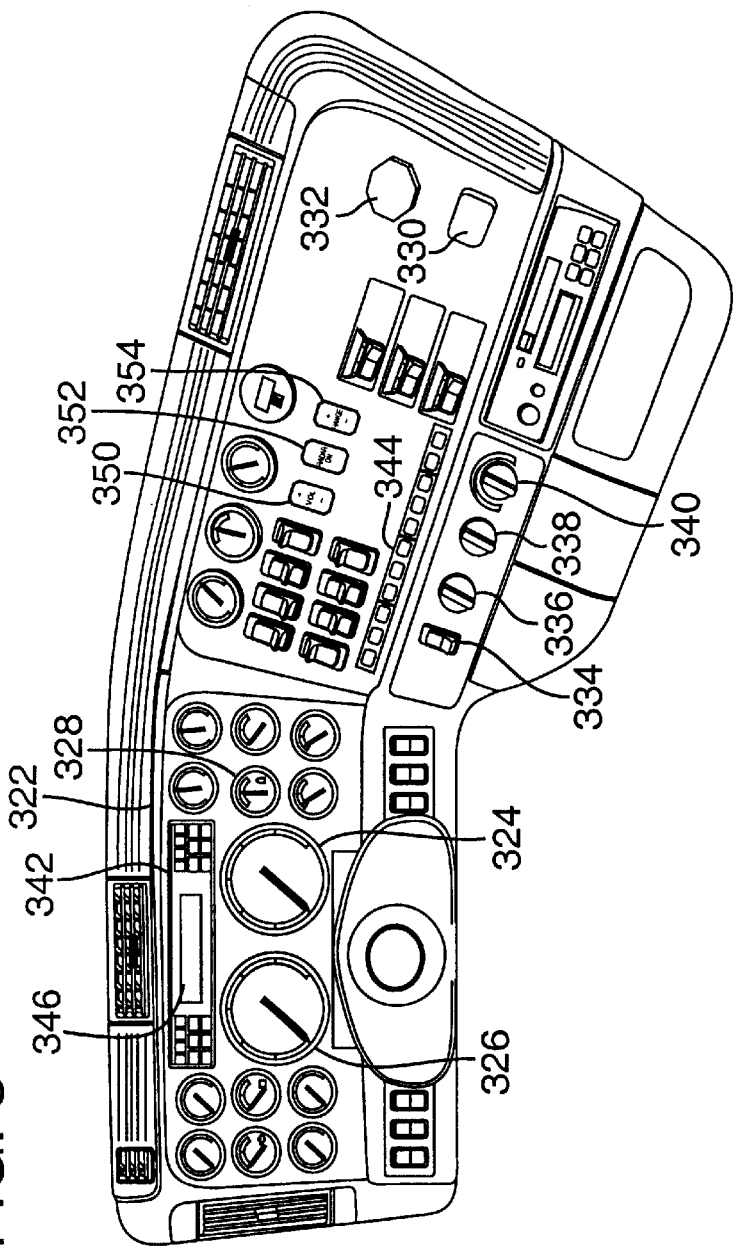
FIG. 3 is a diagram illustrating a vehicle dash, and the positioning of the instrumentation control unit's display on the dash.

FIG. 3 is a diagram illustrating the position of the ICU's display 346 and an input device 344 among the instruments and controls on a dash 322 in one implementation. The dash 322 shown in FIG. 3 includes a number of gauges, including for example, an analog speedometer 324 and tachometer 326, a fuel gauge 328, etc. Instruments located at the dash include a parking brake switches 330, 332, heating, ventilation, and air conditioning (HVAC) controls 334–340, etc.

In addition to these discrete gauges, instruments and indicator lights, the dash also includes the user interface for the control unit, which is referred to as the instrument control unit in this implementation. The user interface of the instrument control unit includes a display device 342 and an input device 344, both located on the dash.

The display device 346, in the current implementation, is a two by 20 vacuum fluorescent display. Alternative implementations are also possible such as a Liquid Crystal Display (LCD) or raster display device. The input device 344 of the ICU is a keypad including dedicated and general purpose function keys. Alternative implementations and configurations of the input device are also possible.

Figure 4:
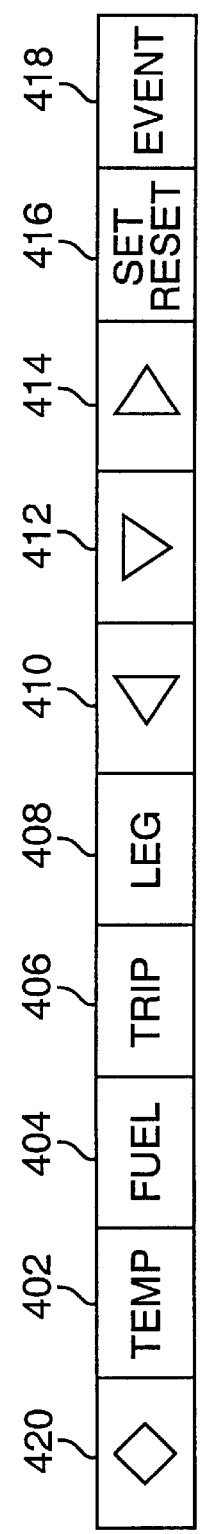
FIG. 4 is a diagram illustrating the keypad for the instrumentation control unit.

FIG. 4 is a diagram of one implementation of the keypad. The keypad includes a number of keys to enable the driver to query the ICU for information and to control its operation. The keypad of FIG. 4 includes the following dedicated keys:

1. Temperature (402)
2. Fuel (404)
3. Trip (Miles, hours and fuel) (406)
4. Leg (Miles, hours and fuel) (408)

The dedicated keys are used to request specific information such as the current outside air temperature (temperature 402), fuel efficiency information 404 (e.g., fuel used in gallons and average MPG), etc. The trip and leg keys 406, 408 are used to display the miles traveled, elapsed hours, and fuel consumed for a trip or a leg of a trip.

The keypad also includes the following general-purpose keys:

1. Left Arrow Key (410)
2. Down Arrow Key (412)
3. Right Arrow Key (414)
4. Set/Reset Key (416)
5. Event Key (418)

These keys can be used to scroll through message screens on the display, enter data, clear messages, etc. For example, these keys can be used to enter configuration data such as the volume object detection range for collision warnings, and the set speed and headway for adaptive cruise control.

The event key enables the driver to log an event. In response to this event, data logging unit 116 in the system persistently stores performance and ECU fault data from the data link occurring during a time period starting a predetermined time before and after the event. For more information on this data logging function see U.S. Pat. No. 5,802,545, which is hereby incorporated by reference.

Finally, the keypad includes an acknowledgment key 420. When the ICU generates a warning message, the driver can use the acknowledgment key to indicate that he/she acknowledges the warning. The ICU responds differently to this key depending on the type and state of the warning condition, as explained in more detail below.

General Vehicle Operating Information and Message Prioritization

During normal operation of the truck, the ICU displays vehicle operating information, including a bar graph illustrating the rate of change of fuel economy and the short term average fuel economy, and an odometer reading. For more information, see U.S. Pat. No. 5,693,876 and co-pending patent application Ser. No. 08/982,117 entitled, "Fuel Use Efficiency System For A Vehicle For Assisting The Driver To Improve Fuel Economy," which are hereby incorporated by reference. The driver can directly access other information via the trip, fuel, leg, and temp input keys as explained above.

In addition, the ICU displays a variety of "priority overwrite" screens that override the normal operating screens when certain operating conditions are detected.

These operating conditions include, for example, park brake on (while vehicle is moving), high coolant temperature, low oil pressure, air filter clog, turn signal on, etc. The ICU generates and controls the display of these overwrite screens according to a prioritization scheme. In the current implementation, for example, there are four levels of alerts: Level 1 "Danger", Level 2 "Warning", Level 3 "Caution", and Level 4 "Note" or "Message." A Level 1 warning is a message intended to evoke an immediate reaction from the driver and is used for extremely serious problems. A Level 2 warning indicates a very serious problem and also requires immediate reaction from the driver.

Level 3 warnings indicate a serious problem and require action soon. Level 4 warnings consist of status information and are intended to require action only when convenient. The driver can acknowledge an alert by pressing the acknowledgement key in the keypad of the ICU.

Each of the four levels of alert is associated with a predetermined message protocol, including a visual and audio indicator. The following table provides an example of the message protocols associated with the four warning levels. When a priority overwrite message is activated, the ICU displays a flashing message and emits a sequence of beeps according to the following protocols.

TABLE 1

AUDITORY CODING

| LEVEL | Number of tones | Length (msec) | Pause between tones (msec) | Frequency of tones | VISUAL CODING ON (msec) | OFF (msec) |
|---|---|---|---|---|---|---|
| DANGER | 7 | 200 | 14 | 560/840 | 400 | 200 |
| WARNING | 4 | 200 | 70 | 560/840 | 400 | 350 |
| CAUTION | 2 | 200 | 140 | 560/840 | 400 | 500 |
| NOTE | 1 | 300 | n/a | 450 | n/a | n/a |
| MESSAGE | 1 | 300 | n/a | 250 | n/a | n/a |

A message from the ICU transitions through a series of states, including "unacknowledged" and "acknowledged." In particular, the message center initially generates a message, the message is in an "unacknowledged" state, meaning that the ICU is seeking a confirmation from the driver that he/she is aware of it. To get the driver's attention, the ICU emphasizes the significance of the message by flashing the text on the display and accompanying the message with audible tones. When the driver presses the acknowledgment key, the message center transitions to an "acknowledged" state. A text message remains on the display until the driver has an opportunity to read and acknowledge it a second time by pressing the acknowledge key again.

The ICU is programmed so that the minimum time between the first and second acknowledgement is long enough (e.g., 3–5 five seconds) to prevent the driver from removing the message by pressing the acknowledgement key rapidly in succession (e.g., a quick double-click of the key). During this time, the acknowledgement key is essentially deactivated to prevent the driver from erasing a message without reading it. When the acknowledgment key becomes active, the message center displays a graphical symbol to inform the driver that he/she can press the acknowledgement key to remove the message. In a case when the driver presses the acknowledgement key before the acknowledge symbol is displayed, the ICU emits an error beep to provide the driver with feedback indicating that he/she acknowledged the warning message too soon.

Figure 5:
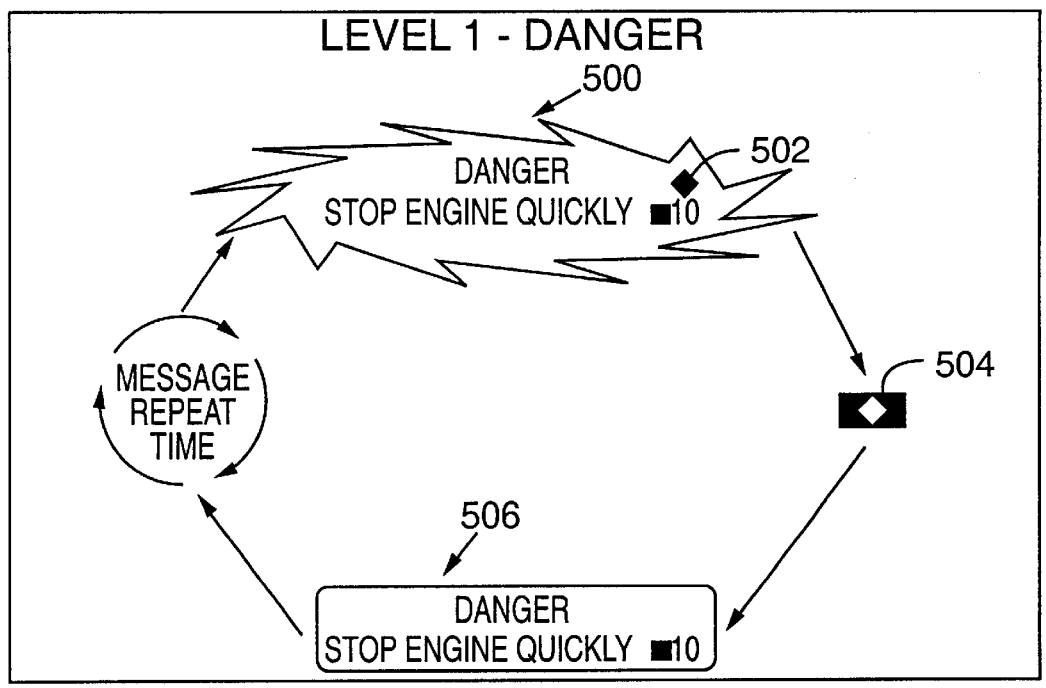
FIGS. 5–7 are diagrams illustrating the operation of four levels of prioritized message displays.

FIGS. 5–8 illustrate the operation of the danger, warning, caution, and note message levels in the message center. When the message center detects a level one condition, it displays the word "DANGER" on the first line of the display and a text message associated with the danger condition on the second line of the display (e.g., STOP ENGINE QUICKLY) as shown in FIG. 5. Initially, the ICU flashes the text message and generates beeping tones as reflected by the graphic 500 at the top of FIG. 5. The graphical symbol 502 indicates to the driver that he/she can disable the flashing and beeping by pressing the acknowledgement key 504. In response to actuation of the acknowledgment key, the message center transitions to the state shown in the rectangular box 506 at the bottom of FIG. 5. The box reflects that the message center is no longer flashing or emitting beeping auditory tones. At the danger level, the message center cycles between a flashing and beeping message state 500 and a non-flashing display without beeping in response to the acknowledgement key. The repeat time of the message is a pre-determined parameter in the ICU that controls when the message center repeats the "unacknowledged" state.

Figure 6:
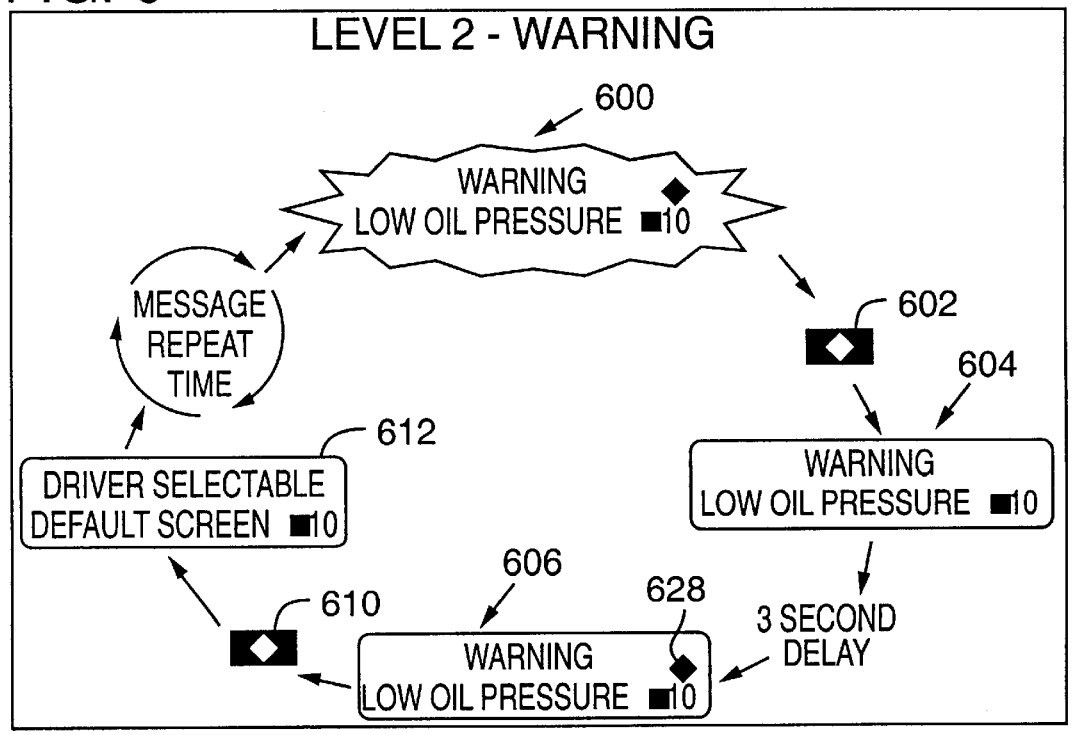
Figure 7:
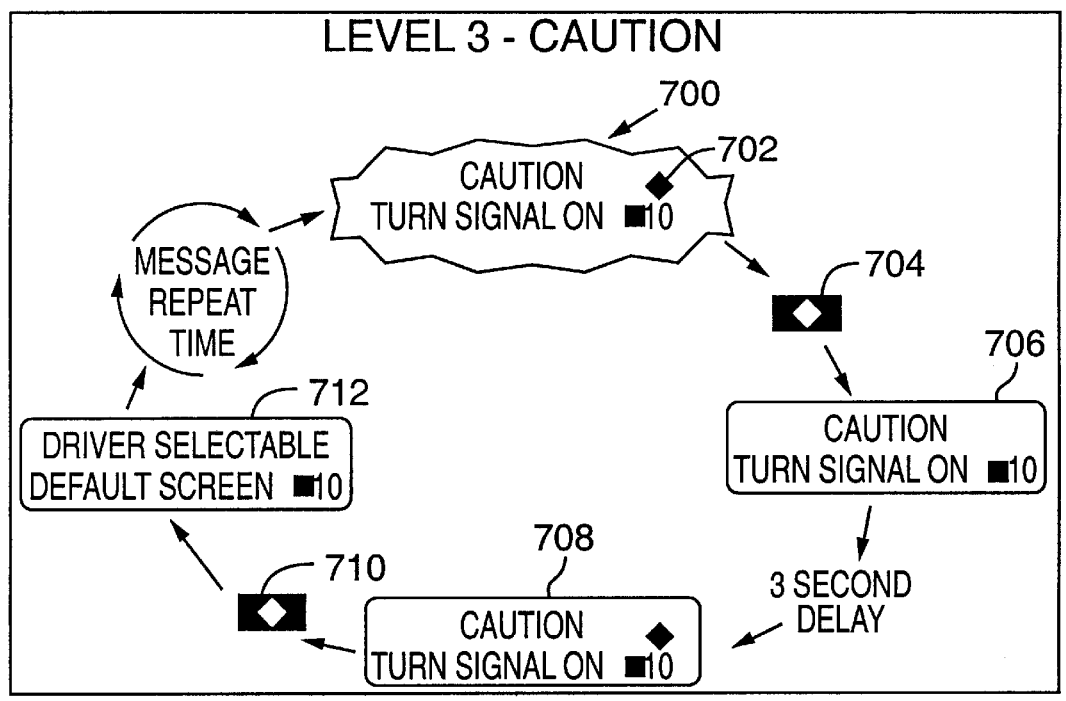
Figure 8:
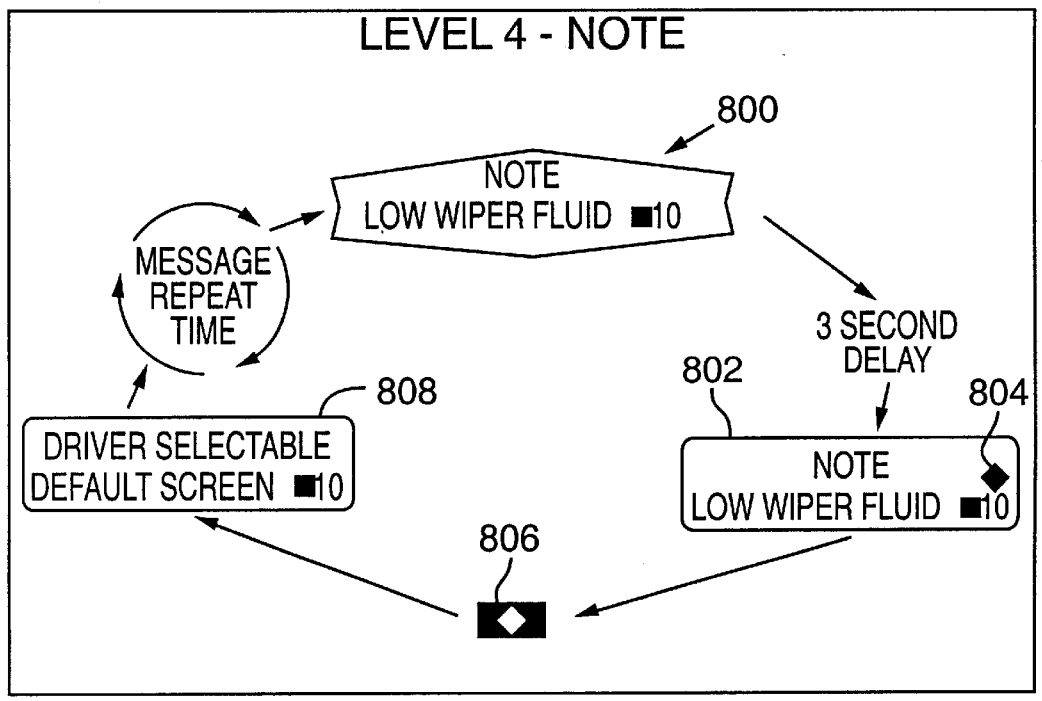
FIG. 8 illustrates the operation of the lowest priority alert, a NOTE alert.

For level two conditions, the message center initially generates a flashing and beeping warning message as reflected by the graphic 600 at the top of FIG. 6, and transitions to three other states before repeating. On the first line of the display, the message center displays the word "WARNING" along with a symbol of the acknowledgement key. On the second line, the message center displays descriptive text associated with the level two condition, such as LOW OIL PRESSURE as shown in FIG. 6.

In response to a first press of the acknowledgement key 602, the message center transitions to a first "acknowledged" state shown as a rectangular box 604 on the right side of FIG. 6. The message center remains in this state for a pre-determined delay period (e.g., 3–5 seconds), and then transitions to a second state shown in the rectangular box 606 at the bottom of FIG. 6. The only difference between the first and second states is the presence of the graphical symbol 608 indicating that the acknowledgement key is active. This symbol informs the driver that pressing the acknowledgement key another time will remove the message from the display. In response to the driver pressing the acknowledgement key 610 a second time, the message center reverts to the driver selectable default screen, as illustrated by the rectangular box 612 on the left-hand side of FIG. 6. If the level 2 condition still persists, the message center repeats the message after a pre-determined period of time has elapsed (i.e. the repeat time).

For level three conditions, the message center progresses through similar states as in level two. However, as reflected by graphic 700 at the top of FIG. 7, the initial message is less intense in that the pause between the tones is longer. Initially, the message center displays the word "CAUTION" on the first line of the display along with the symbol 702 of the acknowledgement key. On the second line of the display, the message center displays descriptive text associated with the warning condition such as "TURN SIGNAL ON." In response to the driver pressing the acknowledgement key 704, the message center transitions to a first state where the message is no longer flashing and beeping and the acknowledgment symbol is no longer illuminated as shown in the rectangular box 706 on the right side of FIG. 7. After a predetermined delay, the message center transitions to a second state where the acknowledgement key is included on the display as shown in the rectangular box 708 at the bottom of FIG. 7. In response to the driver pressing the acknowledgement key 710 a second time, the message center transitions to a driver selectable default screen as shown by the rectangular box 712 on the left-hand side of FIG. 7. The level 3 message will repeat after a predetermined period of time if the condition causing the message is still active.

For level four conditions, the message center begins with a flashing message and a single beep at a lower frequency than the higher level warning messages. This initial state is represented by the graphic 800 at the top of FIG. 8. On the first line of the message display, the message center displays the word "NOTE" and on the second line displays a text description of the warning condition such as "LOW WIPER FLUID." After a pre-determined delay, the message center transitions to a state 802 where the ICU adds a graphical symbol of the acknowledgement key 804 to the display. In response to the driver pressing the acknowledgement key 806, the message center transitions to a driver selectable default screen as shown by the rectangular box 808 on the left side of FIG. 8. The message center then repeats after a pre-determined period of time if the warning condition is still active.

The prioritization scheme implemented in the ICU enables it to integrate several messages and warning indicators for a variety of different electronic subsystems and sensors onboard the vehicle. When the manufacturer wishes to add a new message, it assigns it a priority level within the prioritization scheme. The ICU then determines when and how to display the warning message relative to other messages based on its priority and a set of priority rules.

Table 2 below gives an example of the type of warning messages that are integrated into the prioritization scheme.

TABLE 2

| LEVEL 1 | LEVEL 2 | LEVEL 3 | LEVEL 4 |
|---|---|---|---|
| DANGER PARK BRAKE OFF | WARNING HIGH COOLANT TEMP | CAUTION TURN SIGNAL ON | RECIRC MODE ENGAGED STALE AIR IN 20 MIN. |
| DANGER PARK BRAKE ON | WARNING LOW OIL PRESSURE | PROVIDE FRESH AIR STOP RECIRC. MAX A/C | INCOMING MESSAGE text |
|  | WARNING LOW VOLTAGE | CAUTION CHANGE AIR FILTER |  |
|  | WARNING AIR FILTER CLOGGED |  |  |

In the current implementation, the ICU is programmed to adhere to the following priority rules. First, higher priorities override lower priorities such that a danger condition has the highest priority, followed by warning, caution, and finally note/message. When more than one monitored condition is active at a given time for messages of the same priority level, the most recent message overrides the older message. Danger messages that occur within the same detection period in the ICU alternate every second. In the current implementation, the detection period is 200 milliseconds. The ICU manages warning messages that occur in the same detection period by showing one warning or caution for at least fifteen seconds and then switching to the second warning or caution. Finally, the ICU displays messages that are received in the same detection period sequentially.

Integration of Collision Warning System into the Message Center

The ICU and its message center act as the driver interface for the collision warning system. When the CWS detects a collision warning condition, it communicates the condition to the ICU, which in turn, generates the appropriate message from the message center, which typically includes a visual and an accompanying auditory warning. According to human factors studies, auditory signals are the most dominant source of information to the driver. Therefore, the auditory warnings associated with each collision warning condition are selected to ensure that they are not confused with other sounds in the vehicle, or masked by other sounds. In addition, for quick and accurate interpretation of visual signals, the message center provides the visual warnings associated with each warning condition in the driver's line of sight (see, for example, the position of the display on the dash in FIG. 3).

FIG. 9 is diagram illustrating an implementation of the visual indicators for the collision warning system integrated into the message center. The current implementation of the message center displays five different visual indicators 900–908. As the closing distance between the truck and the vehicle in front of it decreases, the message center displays progressively stronger visual warnings and generates corresponding auditory warnings. For example, the top three visual indicators 900–904 shown in FIG. 9 illustrate the display screen of the message center for first, second and third stage distance alerts from the collision warning system. As the closing time between the truck and the obstacle reaches predetermined values associated with each stage, the message center displays a progressively larger triangle and the words, "DANGER AHEAD." The message center also displays the large triangle alert 904 in response to warning messages associated with the detection of a stationary or slow moving object.

When the collision warning system detects an object within a predetermined distance (e.g., 350 feet), but this object does not represent a significant threat of collision, the message center displays a small triangle 906 in the default screen 910 of the message center. In other words, the visual indicator of the detection does not overwrite the current default screen, but instead is combined with it. In the example shown in FIG. 9, the default screen displays the short term average fuel economy 912, a bar graph representing changes in fuel economy 914, and the odometer reading 916. This default screen is merely one example of the type of normal operating condition data that may be displayed with the object detection indicator 906. In an alternative implementation, the visual indicator of a detected object may be designed to overwrite the current default screen.

Another collision warning message integrated into the message display is the creep alert (see screen 908, FIG. 9). The message center displays the creep alert screen 908 when the collision warning system detects a object less than a predetermined distance ahead (e.g., 15 feet) and the truck is creeping (e.g., the truck speed is less than 2 MPH).

In addition to integrating collision warnings into the message center, the current implementation also integrates control switches for the collision warning system into the dash of the vehicle. FIG. 3 shows an example of these controls, which include a volume control 350, an ON/OFF control 352 and range control 354. The volume control allows the driver to adjust the volume of auditory warnings, while the range control allows the driver to control the range of the forward object sensor. Both the volume and range controls are implemented with rocker switches in the current implementation. The ON/OFF button is implemented with a back lit push button.

In addition to the visual warnings illustrated in FIG. 9, the message center generates auditory warnings as well. Tables 3A and 3B below provide a brief summary of message protocol codings in alternative implementations of the ICU.

TABLE 3A

Auditory Coding

| Tone No. | Warning Description | Number of Tones | Length (msec) | Pause Between Tones (msec) | Frequency of Tones | Visual Coding |
|---|---|---|---|---|---|---|
| 0 | side detection | 3 | 100 | 14 | 1400, 2000, 1600 | red LED in right dash display |
| 1 | Stationary object Slow moving object ahead 1 Sec. Following Distance | 7 | 200 | 14 | 1800/ 1200 | Large triangle in Message Center plus DANGER AHEAD |
| 2 | 2 Sec. Following Distance Creep Alarm | 4 | 200 | 70 | 1800/ 1200 | Medium triangle in Message Center plus DANGER AHEAD |
| 3 | 3 Sec. Following Distance | 2 | 200 | 140 | 1800/ 1200 | Small triangle in Message Center plus DANGER AHEAD |

TABLE 3B

| Tone No. | Description | Tone Pattern (Bold = active, Non-bold = pause) (in msec) | Frequency of Tones (in Hz) |
|---|---|---|---|
| 0 | • Side Sensor Alert<br>• ID Read Pass | 96, 96, 32, 96, 96 | 2000, 2400, 0, 2400, 2000 |
| 1 | 1 sec. following distance | 80, 80, 80, 80 | 1800, 600, 1800, 600 |
| 2 | 2 sec. following distance | 80, 80 | 1800, 600 |
| 3 | Proximity Alert | 64, 64, 80, 64, 64 | 800, 400, 0, 800, 400 |
| 4 | Volume Change | 48 | 600 |
| 5 | • Download Success<br>• Accident Reconstruction Freeze Confirmation | 300, 100, 300 | 450, 0, 450 |
| 6 | • Built-in Self-Test Failure<br>• No Driver ID<br>• Download Fail<br>• Accident Reconstruction Freeze Failure<br>• ID Read Fail<br>• Low Voltage | 300 | 250 |

Table 4 provides a more detailed description of an integration of features of the collision warning system into the message center (M.C.) and dash display.

TABLE 4

Integrated Format

| Feature | Display Auditory | Visual | Control/Sensing Unit |
|---|---|---|---|
| Power-On Drivers Card Status | None | light on switch illuminates when system is on (M.C. NOTE if card is not inserted) | Rocker switch |
| Volume Control | 1 short tone for each change increment (at the new volume level) | M.C. display RADAR VOL 75% (displayed for 7 seconds after each change) | Rocker switch (default setting = ¾ maximum volume) |
| Speaker | all auditory output | n/a | adjusted by volume control |
| Range control/accident recorder | 1 short tone for each ¹⁄₁₀ second change in range setting | M.C. display: MAX RADAR RANGE 2.5 SECONDS (gives current maximum range setting based on following distance) | Rocker switch dash or steering wheel (default setting at maximum range) |
| System failure | M.C. tones for warning | TELLTALE: RADAR FAIL (red) M.C. message: WARNING RADAR SYSTEM FAILURE | System check sensor (performed every 15 seconds during normal operation) |
| Adjustments in Lighting | n/a | n/a | Message Center is automatically dimmed |
| Vehicle detection | none | very small triangle on default screen of M.C. and/or detect indicator light | object detected within 350 feet |
| 1st stage distance alert | See tone No. 3, Table 3A | DANGER AHEAD small triangle (figure below) | 3 second sensor |
| 2nd stage distance alert | See tone No. 2, Table 3A | DANGER AHEAD medium triangle (figure below) | 2 second sensor |
| 3rd stage | See tone No. 1, Table 3A | DANGER AHEAD | 1 second sensor |

TABLE 4-continued

Integrated Format

Display

| Feature | Auditory | Visual | Control/Sensing Unit |
|---|---|---|---|
| distance alert | | large triangle (figure below) | |
| Stationary object | See tone No. 1, Table 3A | DANGER AHEAD large triangle (figure below) | Should be set for a distance appropriate to speed of vehicle (to reduce false alarms) |
| Slow moving object | See tone No. 1, Table 3A | DANGER AHEAD large triangle (figure below) | Should be set for a distance appropriate to speed of vehicle (to reduce false alarms) |
| Creep alarm | See tone No. 2, Table 3A | CREEP ALERT row of small triangles (figure below) | Vehicle speed <2 mph & object less than 15 feet ahead |
| No vehicle detected in blind spot | none | yellow light on dash display | Stays on when no vehicle is detected by the blind spot sensor |
| Vehicle detected in blind spot | See tone No. 0, Table 3A | red light on dash display | Activated when objects are detected by the blind spot sensor |

As explained above, the message center integrates messages from a variety of different vehicle systems using a prioritization scheme. It also uses a prioritization scheme to integrate the messages from the collision warning system. In the current implementation, the priority rules for integrating collision warning messages are as follows. The warning messages for a stationary object, slow moving object, and the shortest monitored following distance (one second) are assigned the highest priority and override level 1 danger alerts. As such, the immediate external threat takes precedence over in-vehicle dangers. The level 1 danger alerts have the next highest priority and override collision warning alerts for following distances of two and three seconds and the creep alarm. The rationale for ranking level 1 danger alerts ahead of these collision alerts is that severe in-vehicle dangers take precedence over less immediate external threats. Level two warning messages and level three caution messages may override collision warnings for two and three second following distances if those collision warnings have been displayed for at least fifteen seconds. The rationale is that the driver has most probably chosen a particular distance to the vehicle ahead and intends not to change the following distance. In this case, the driver is aware of the situation and a level two or level three message override the collision warning conditions.

A summary of the priority assignments for the message center and collision detection warnings is provided below in Table 5. Note that Table 5 represents only an example of one possible implementation. Alternative codings are possible, such as the auditory codings shown in Table 3B.

TABLE 5

Overview of Priority Assignments and Auditory Signals for Message Center

| Priority Level | Warning Description | Number of Tones | Length (msec) | Pause Between Tones (msec) | Frequency of Tones |
|---|---|---|---|---|---|
| 1 | Stationary Object Slow Moving Object 1 Sec. Following Distance | 7 | 200 | 14 | 1800/ 1200 |
| 2 | Message Center: | 7 | 200 | 14 | 560/840 |

TABLE 5-continued

Overview of Priority Assignments and Auditory Signals for Message Center

| Priority Level | Warning Description | Number of Tones | Length (msec) | Pause Between Tones (msec) | Frequency of Tones |
|---|---|---|---|---|---|
| | DANGER | | | | |
| 3 | 2 Sec. Following Distance Creep Alarm | 4 | 200 | 70 | 1800/ 1200 |
| 4 | 3 Sec. Following Distance | 2 | 200 | 140 | 1800/ 1200 |
| 5 | Message Center: WARNING | 4 | 200 | 70 | 560/840 |
| 6 | Message Center: CAUTION | 2 | 200 | 140 | 560/840 |
| 7 | Message Center: NOTE/MESSAGE | 1 | 300 | n/a | 450 |
| independent level | Side Object Detection (may be given with any other warning) | 3 | 100 | 14 | 2400, 2000, 1600 |
| | Message Center: "Key press not available" or "improper use" tone | 1 | 300 | n/a | 250 |

The priority level specified in the Table refers to the priority of a message from the perspective of the ICU. In particular, the ICU is programmed to arbitrate among messages of different priority according to these levels. This priority level scheme is separate from the priority of messages in the J1587 protocol. The J1587 protocol implements a priority scheme for controlling which messages take precedence when transmitted concurrently on the data link.

While the above table provides specific implementation details, it is possible to deviate from these specifications without departing from the scope of the invention. A number of additional design details are worth noting, keeping in mind that these details are not necessary for implementation of the invention. First, the auditory signal should be at least ten dB above in-cab sound level in the particular frequency range. In general, auditory warnings should be prioritized based on the number of tones and the pauses between the tones. In particular, the greater the number of tones (e.g., 1, 2, 4, 7) and the shorter the pauses between the tones (e.g., 14 msec., 70 msec., 140 msec.), the higher the priority. Preferably, the auditory tones for collision warnings should be distinguishable from the auditory tones used for other messages in the message center. In the current implementation, the non-collision warnings have a noticeably lower frequency (e.g., 560–840 Hz) than the collision detection warnings (e.g., 1200–1800 Hz). In addition, to allow the driver to better distinguish between different types of warnings, the message center warnings use a repeating tone sequence of low to high, while the collision warning tones use a tone sequence from high to low.

In the current implementation, the CWS ECU communicates visual messages to the ICU via the J1708 data bus according to the J1587 communication protocol. The CWS ECU is wired to the speaker of the ICU and drives the speaker directly to generate auditory warnings. In alternative implementations, the CWS ECU could communicate messages for both auditory and visual warnings over the data link using the J1587 standard, via discrete wiring, or some combination of both.

To communicate instructions for visual warnings, the CWS ECU broadcasts data bus messages over the J1708 data link. FIG. 10 illustrates a table listing the display message and the corresponding data bus message used to instruct the ICU to display it. The messages are listed in order of priority. If the ICU receives a message with higher priority than the one it is currently displaying, it displays the higher priority message as soon as it receives the message from the data bus. As noted above, the priority scheme implemented in the ICU is different than the priority of message transmission on the J1587 data link. The internal priority controlled within the ICU is reflected by the ordering of the messages in the left-most column. The J1587 message priority is noted in the right-most column.

Message 22 in the table shown in FIG. 10 is the data required to display the following text message on the message center:

Cruise Set to: xxMPH
Headway Set to: eee_s
where eee is the headway data in ASCII characters, example: 3.0, to be used in data bus message 219 226 8 48 8 2 16 140 e e e chksum.

Following is a description of data bus message 22 (it applies to other messages as well):
219 226 8 48 8 2 16 140 e e e chksum.
219=MID (CWS ECU)
226=PID (Text Message to Display)
8=Number of bytes following
48=Status Character 1 (48 decimal=00110000 binary)
  Bit 8=0 (Use selected language)
  Bit 7=0 (Message OK)
  Bit 6=0 (Predefined text)
  Bit 5=1 (Display buffered message)
  Bit 4=0 (No sound; sound is controlled by the EVT-300 directly)
  Bit 3=0 (No acknowledgement)
  Bit 2=0 (Do not expect acknowledgement from operator)
  Bit 1=0 (Do not send acknowledgement)
8=Status Character 2 (8 decimal=00001000 binary)
  Bits 8–4=00001 (defined as 1 Second; actually is less than 1 second)
  Bits 3–1=000 (Priority 0)
2=Message row/line number (second line of display)
16=Message column number (16th column)
140=Proprietary message (defined as the MID of the device that has the display; MID 140=ICU)
e e e=Proprietary message (defined as the ASCII value for the headway, ex. 3.0).

For more information on the message format, see Appendix C of the J1587 standard.

In managing the output of collision warning messages, the ICU follows a set of predetermined guidelines. For each message in the table of FIG. 10, the message center displays the corresponding message for a predetermined period of time, namely 1.0 second. To display the message a longer period of time, the CWS ECU sends the same message again after 0.5 seconds, and continues re-sending at this rate. Upon receiving a data bus message, the ICU sets a timer to 1.0 second, and continues to display the message as long as the timer has not elapsed. The ICU resets the timer (to a full 0.75 seconds) upon receiving a new message. This approach for re-sending messages and re-setting the timer with each new message ensures that the delay between transmissions of messages will not produce a flicker in the ICU display.

Another feature relating to the integration of collision warnings into the message center is the ability to select a driver for the purpose of logging events on a per driver basis. The ICU provides a display that enables the driver to enter a driver identification (ID), and is programmed to broadcast a message on the data bus including the driver ID. The CWS ECU and other ECUs are programmed to store the driver ID and record it along with events that they monitor. In particular, the current implementation of the ICU broadcasts the driver ID in PID 507 of the J1587 protocol, in response to a request from another ECU (e.g., the CWS ECU) using MID 219.

Figure 11:
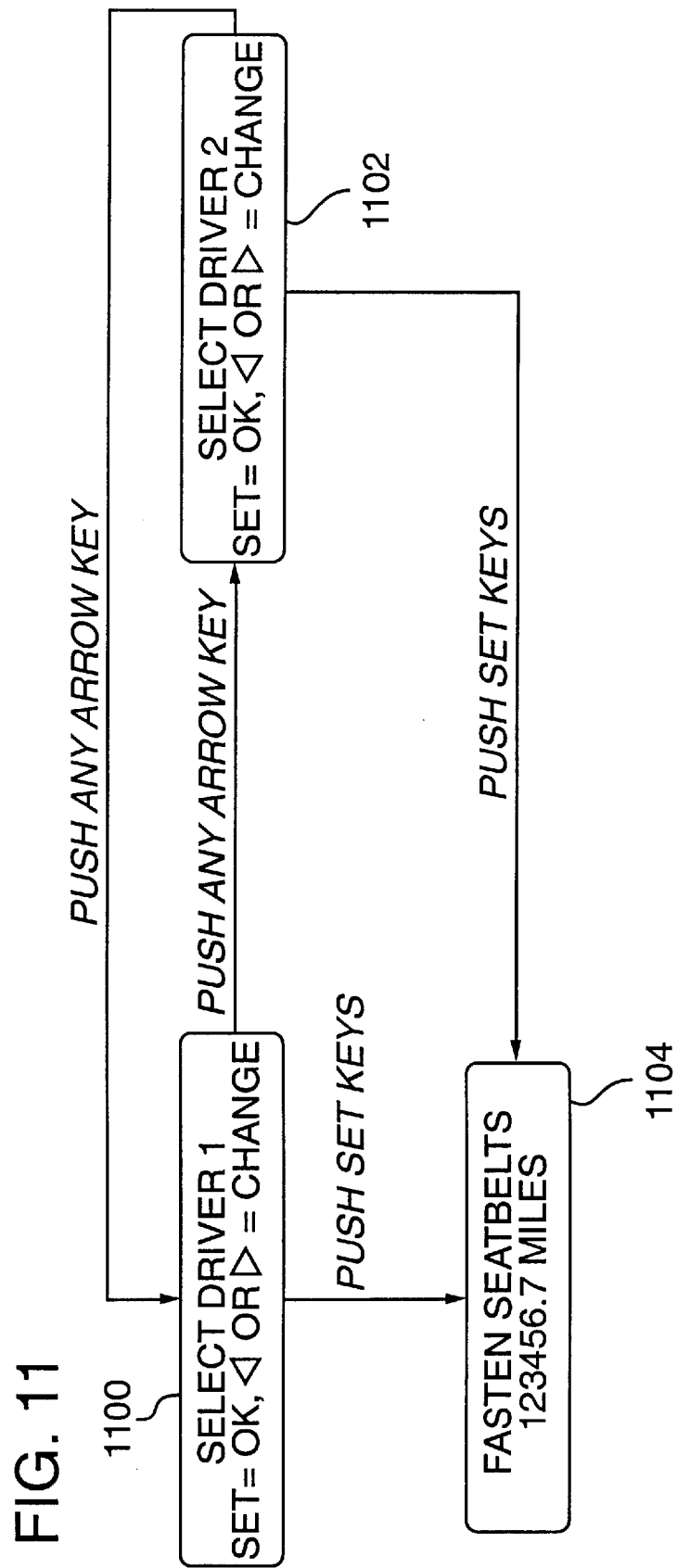
FIG. 11 is a diagram illustrating screens in the message center for identifying the driver to the system for the purpose of maintaining a driver specific data record of operating events, including collision detection events.

In the current implementation, the ICU prompts the driver to enter the driver ID during the ignition sequence. During the ignition sequence, the message center displays screens that prompt the driver to accept the currently active driver ID or to select a new one. FIG. 11 illustrates an example of the message center displays 1100, 1102 used to prompt the driver for the ID. The driver can either select the active driver ID by pressing the set key in response to the first screen, or select a new driver by pressing an arrow key as shown. After the driver presses the acknowledgement key at either screen 1100, 1102, the message center continues with the ignition sequence as shown in the third screen 1104 in FIG. 11.

In response to the selection of the driver ID, the ICU sends a PID 507 message, Driver Identification, over the SAE J1708/1587 data link to indicate what driver is active (Driver 1 or Driver 2) as soon as the driver acknowledges the ICU screen prompt, per the following message formats:

| Driver 1 | | | | | |
|---|---|---|---|---|---|
| MID | PID | n | ASCII | ASCII | |
| 140 | 507 | 2 | 49 | 42 | Cksum |
| | | | (1) | (*) | |

Note that PID 507 is sent as two consecutive bytes: 255 followed by 251.

| Driver 2 | | | | | |
|---|---|---|---|---|---|
| MID | PID | n | ASCII | ASCII | |
| 140 | 507 | 2 | 50 (2) | 42 (*) | Cksum |

Again, note that PID 507 is sent as two consecutive bytes: 255 followed by 251. The message will be available from the ICU also upon request, per the following message format:

| Request | | | | |
|---|---|---|---|---|
| MID | PID | a | b | |
| 219 | 384 | 251 | 140 | Cksum |

Note that PID 384 is sent as two consecutive bytes: 255 followed by 128.

Integration of Adaptive Cruise Control into the Message Center

The driver interface for adaptive cruise control is integrated into the ICU and its message center. In the current implementation, the driver interface for the ACC system includes the ICU's message center and indicator lights as well as input switches on the dash. The ICU integrates ACC related information and warnings into the message center and also controls ACC related indicator lights. When the driver enters ACC input via dash switches, the ICU displays visual feedback to the driver via alphanumeric messages on the display screen.

The ACC system includes the CWS ECU, the ICU, the engine ECU, the transmission ECU, the anti-lock brake ECU, and the engine retarder ECU. The ACC software executing on the CWS ECU uses the collision warning sensors to track targets and send messages to other ECUs to reduce vehicle speed when a target is too close to the truck. For example, in the current implementation based on the EVT-300 collision warning system from Eaton VORAD technologies, the CWS ECU maintains a constant headway with a lead vehicle by sending messages to: 1) control the throttle; 2) invoke the engine brake; and 3) downshift the transmission. Depending on the circumstances, the CWS ECU sends messages to the engine ECU to defuel the engine via the speed/torque limit override mode of the J1939 standard. It may also send messages to the engine brake to retard the engine via the torque control override mode of the J1939 standard. Finally, it may send a message to the transmission ECU to downshift the transmission according to the J1939 standard.

The CWS ECU communicates ACC related information to the ICU via either discrete wiring, a data link, or some combination of discrete wiring and a data link. In the implementation based on the EVT-300 collision warning system, the CWS ECU communicates instructions for visual messages to the ICU via the J1708 data link, and sends control signals for auditory warnings directly to the ICU speakers via discrete wiring. In an alternative implementation based on the ADC adaptive cruise control system, the CWS ECU communicates control messages for auditory and visual messages to the ICU via the J1939 data link.

The driver provides ACC related input via dash controls in the cabin. These controls include cruise control switches such as an ON/OFF/mode switch, and a SET/RESUME switch. The ON/OFF/mode switch enables the driver to turn on and off cruise control and, in some implementations, switch between ACC and conventional cruise control (i.e. cruise control without headway control). The operation of this control switch varies, depending on the implementation. For example, in one implementation, ACC is always active when the driver turns on the cruise control. The only exception is failure of ACC, in which case, the system reverts to conventional cruise control operation. In an alternative implementation, the driver can switch between no cruise control (OFF), adaptive cruise control (Adaptive Cruise), and conventional cruise control (Cruise). In this case, the ON/OFF/mode switch is a three-position switch with positions for Adaptive Cruise, Cruise and OFF.

The SET/RESUME switch is similar to conventional cruise control in that it allows the driver to enter the set speed and resume cruise control operation. When the driver actuates this switch, the cruise control within the engine ECU communicates the set speed to the CWS ECU and the ICU via the J1708 data link.

Another ACC related switch is a volume control, which is similar to the volume control used in the collision warning system to adjust the volume for auditory warnings. In implementations where this switch is wired to the CWS ECU, the CWS receives the input and formulates a message to the ICU, instructing it to display a message showing the volume level. Similar functionality may be achieved in an implementation where the volume switch is wired to the ICU directly. In this case, the ICU displays the volume level in response to direct inputs from the volume control.

Finally, there is a headway control switch, which enables the driver to set the headway. In implementations where the headway control is wired to the CWS ECU, the CWS receives the input and formulates a message to the ICU for the J1708 data link, instructing it to display a message showing the selected headway. Similar functionality may be achieved in an implementation where the headway control is wired to the ICU directly. In this case, the ICU displays the selected headway in response to direct inputs from the headway control and formulates a message to the CWS ECU for the J1708, informing it of the headway setting.

The method for communicating driver input to the ACC system varies, depending on the implementation. In the implementation that integrates the EVT-300 collision warning system, the switches are wired into the CWS ECU, and the CWS communicates instructions for visual messages to the ICU. In the implementation that integrates the ADC distance control system, the switches are wired directly into the ICU, the ICU communicates headway parameters to the distance control system.

The ICU provides three microprocessor controlled indicator lights for ACC functions located near the message center. One light indicates whether the adaptive cruise control is active. The ICU detects this condition from the data link via messages from the engine ECU and CWS ECU. The condition for this active light is: no active fault from the CWS ECU (MID 219), battery voltage (PID 168) is normal in the CWS ECU, and the cruise control is active (PID 85) from the engine ECU (MID 128).

A second light indicates that the ACC system has detected a target. The ICU activates this light for preprogrammed duration (e.g., 200 ms) on receipt of a pre-determined message (e.g., 219_226_6_48_8_1_1_140_4_ CHKSUM) from the CWS ECU on the data bus.

Finally, the third light indicates that the ACC system has failed from the CWS ECU. The ICU detects this condition by detecting an active fault or no battery voltage PID 168 signal from the CWS ECU (MID 219). In this implementation, the battery voltage signal from the CWS ECU acts as a "heartbeat" indicating that the CWS ECU is operating.

Figure 12:
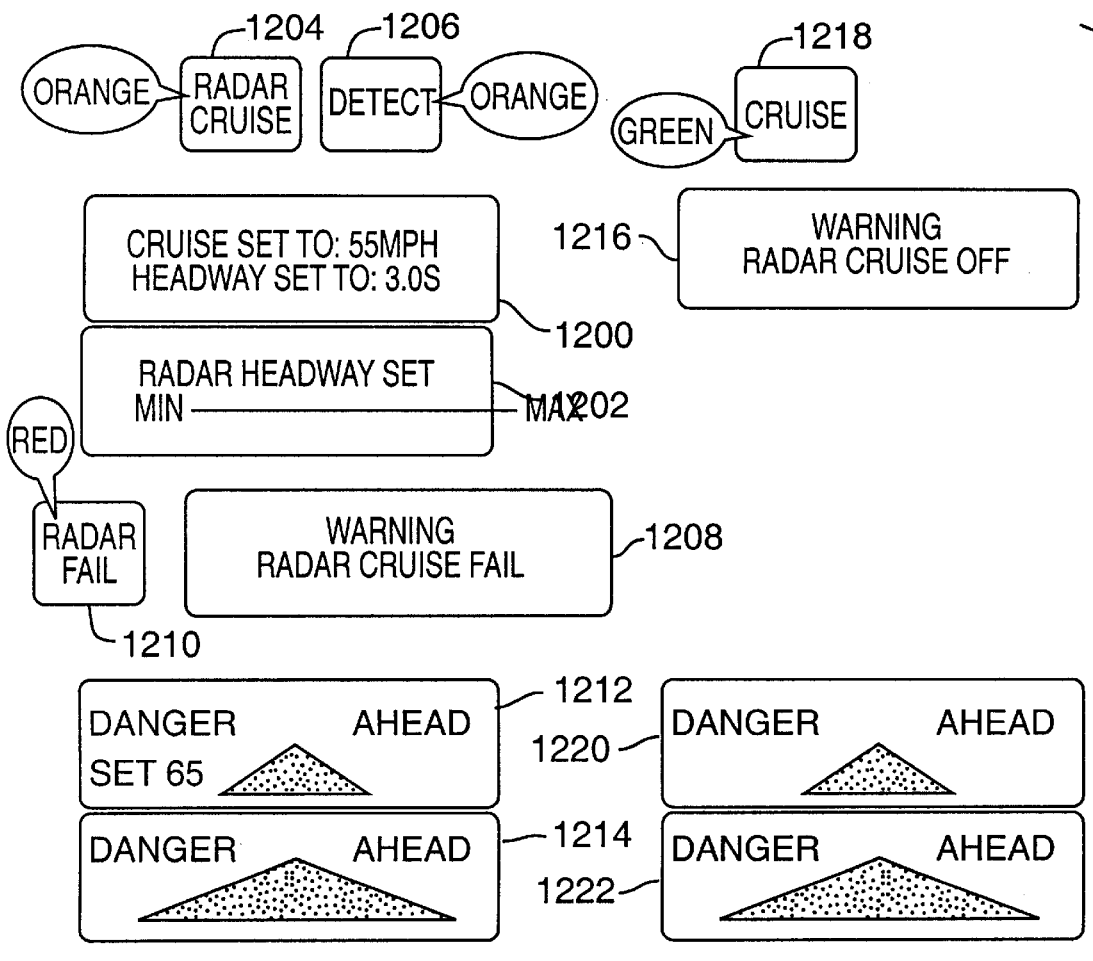
FIG. 12 is a diagram illustrating screens in the message center for reporting adaptive cruise control information.

In addition to the ACC-related indicator lights, the ICU also displays visual messages on its display screen. In the current implementation, the ACC related display screens fall into three categories: function set messages, failure warnings, and danger ahead warnings. FIG. 12 illustrates examples of the ACC related indicator lights and these display screens.

The ICU displays function set messages in response to input from the driver setting parameters relating to adaptive cruise control. When the driver enters the set speed using the SET/RESUME switch, the ICU displays a screen 1200 with a text message indicating that radar cruise is active, the value of the set speed, and the time headway as shown in FIG. 12. Also, when the driver sets the headway via the headway switch on the dash, the message center displays a screen 1202 showing the time headway setting. The terms "min" and "max" are the lower and upper limits of a bar graph display, graphically depicting time headway. As the driver increments or decrements the current value of the headway, the message center displays the current value of the headway.

The ACC system uses the ICU's indicator lights to show changes in its status. When the driver activates the adaptive cruise control system, the ICU illuminates the radar cruise indicator light 1204. While in adaptive cruise control mode, the ICU illuminates a DETECT indicator light 1206 when the collision warning system is tracking a vehicle.

The message center displays a warning screen 1208 in FIG. 12 when the radar system fails. In addition, the ICU illuminates a radar fail indicator light 1210.

While the adaptive cruise control system is active, the message center also displays "danger ahead" messages 1212, 1214 in response to collision detection events from the collision warning system. These messages are triggered as described above in connection with the integration of the ECU collision warning system into the ICU message center. The message center displays the set speed along with the "danger ahead" message as shown in screen 1212. However, as the urgency of the "danger ahead" message increases, the ICU removes the set speed and displays a larger triangle to emphasize the increase in danger as shown in screen 1214.

In the event that the adaptive cruise control system becomes inactive while the vehicle is in cruise control mode, the message center displays a warning such as the one shown in display screen 1216 in FIG. 12 to indicate to the driver that the radar cruise control is off. At the same time, the ICU turns off an indicator light 1218 to indicate that the vehicle is not in cruise control mode. While the vehicle is in cruise control mode, the collision warning system and the ICU revert back to the message scheme described above in connection with collision detection warnings. In particular, the message center displays progressively more intense warning messages such as the ones shown in screens 1220 and 1222 in FIG. 12 when the collision warning system detects that the following distance has fallen below predetermined thresholds such as headway values of one and two seconds. The difference between the collision warnings shown in screens 1220 and 1222, and the collision warnings during ACC mode is that the ICU displays the set speed (e.g., screen 1212) during ACC mode, as long as the severity of the message has not increased to the point where the warning triangle dominates the display screen (e.g., screen 1214).

The ICU determines when to display failure related messages by monitoring the status of the adaptive cruise control system via the J1708 data link. The collision warning system conducts periodic self checks (e.g., every fifteen seconds) to determine if it is operating properly. It then sends a message on the J1939 data link indicating that the adaptive cruise control system is active every 100 msec, as long as it has not detected any critical faults that might prevent proper operation. In the event that the CWS ECU determines that it has a critical fault, then it discontinues sending the message onto the J1939 data link, and sends a fault message via the J1587 data link to the ICU for the driver display. In response to the lack of heartbeat from the CWS ECU, the engine ECU reverts back to normal throttle control rather than cruise control mode. In response to the fault message on the data link, the ICU displays message screen 1208 shown in FIG. 12 indicating a radar cruise control failure.

The engine ECU is programmed to monitor the status of the ACC system when the ACC system is installed on the vehicle. The engine ECU monitors the status of the adaptive cruise control system via the J1939 databus. The collision warning system is powered on when the ignition is switched on. After a self-check, the ACC system starts transmitting the heartbeat. The engine ECU is programmed to check whether the heartbeat is present on the databus at ignition startup. If the heartbeat is not present at that time, the engine ECU disables its ACC mode and returns to throttle mode. After power-up, the engine ECU continually monitors for the heartbeat and is programmed to assume that the ACC is no longer functioning if it does not receive a heartbeat for over a pre-determined period of time (e.g., 350 msec). In this case, it disables the cruise control and returns to throttle control.

To enable conventional cruise control when ACC fails, the driver can toggle the cruise control ON/OFF switch twice within ten seconds. Once this sequence is accomplished, the engine ECU enables conventional cruise control. If the ACC heartbeat comes back to the databus, then the engine ECU will allow ACC operation, but only at the next cruise control power ON cycle. This avoids the possibility of the engine being in conventional cruise control mode and adaptive cruise control being reactivated without driver notification and acknowledgement.

The adaptive cruise control messages are integrated into the ICU's message center in a similar manner as the collision warning messages. Table 5 above illustrates the priority of collision warning messages in the context of the ICU's prioritization scheme, which includes danger, warning, and caution alerts. When the CWS ECU detects collision warning events during operation of the ACC system, it sends messages to the ICU communicating these events. The ICU treats these messages as having the same priority as in the case where the ACC is not active. When the ICU detects a condition from the data link indicating that the ACC system has failed or has become inactive, it generates a "warning" level message (see, e.g., priority level 5 in Table 5, showing the priority of a "warning" level message relative to collision alerts and other ICU messages). Finally, in response to user input relating to the ACC system, the ICU displays function set messages, such as the time headway setting (see, e.g., messages 6–13 in FIG. 10), and the alert volume (see, e.g., messages 14–21 in FIG. 10). When the driver changes/enters the set speed or headway, the ICU displays the set speed and headway information as illustrated in screen 1200, FIG. 12. The ICU also displays screen 1200 while in ACC mode in response to detecting that the vehicle speed from the engine ECU has dropped an increment of 5 MPH below the set speed. FIG. 10 shows this message as message number 22. Note that the ICU prioritizes this message below that of the function set messages (e.g., messages 6–21 in FIG. 10) and the collision warning messages (e.g., messages 1–5 in FIG. 10).

Integration of Transmission Display into the Message Center

The ICU integrates the transmission display into the message center. One particularly advantageous feature of the ICU is the ability to provide a standard interface for a variety of transmission types, such as automated mechanical transmissions, automatic transmissions, and mechanical (i.e., manual) transmissions. The message center displays the current gear of the vehicle and, for some transmission systems, the driving mode of the transmission (e.g., automatic or manual mode for an automated mechanical transmission). The message center may also display indicators (e.g., up/down arrows) to prompt the driver to shift for better fuel economy.

In addition to visual information, the ICU provides auditory information as well. The ICU generates an auditory warning to indicate to the driver that an inappropriate gear has been selected.

In the case of both visual and auditory information, the transmission ECU communicates instructions for this information to the ICU via the J1708 link according to the J1587 standard.

Figure 13:
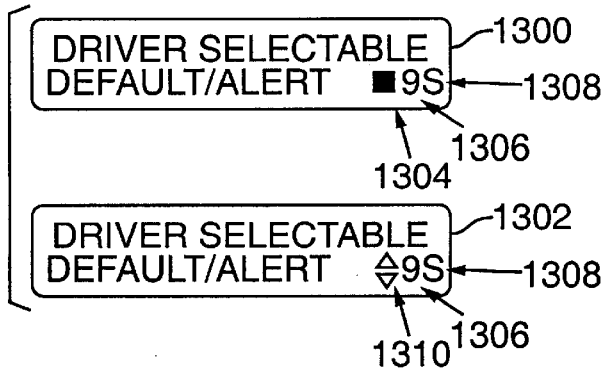
FIG. 13 is a diagram illustrating how transmission information is integrated into the message center.

FIG. 13 illustrates examples of display screens 1300, 1302 that display transmission information in the current implementation. In providing this display information, the ICU works in conjunction with the transmission ICU. The transmission ECU receives instructions for shifting the transmission and selecting the driving mode from a shift lever in the vehicle. For more information on the operation of the shift lever, see co-pending application entitled, "Lever Assembly for an Electronically Controllable Vehicle Transmission", which is incorporated by reference above.

As illustrated in display screen 1300 shown in FIG. 13, the message center displays at least three characters (e.g., 1304, 1306, 1308) that are related to the transmission display. At least one character 1306 displays the current gear. Another character 1308 displays the driving mode of the transmission. Another character 1304 may be used to separate the transmission display from other messages. Since the message center always provides a transmission display, it indicates the characters relating to the transmission display along with whatever else is currently displayed, which is either the driver's selectable default screen or an alert screen.

The second display screen 1302 shown in FIG. 13, illustrates the case where at least one character 1310 display an up or down arrow to prompt the driver to shift to improve fuel economy. In this case, the arrow character also functions to separate the transmission information from other information that is currently presented on the same line of the display.

As noted above, the ICU can provide visual and auditory information for a variety of transmission systems. In one implementation, the message center is used to display transmission information for an automated mechanical transmission. The driver controls the transmission via a shift lever that enables the driver to select a gear by actuating the lever, and also allows the driver to select the driving mode via a switch on the stalk of the lever. In this particular implementation, the message center displays the current gear at all times in which the automatic shifting mode is selected. The message center displays the current gear in manual shifting mode until the driver selects a new gear through actuation of the shift lever. The new gear may be flashed for a pre-determined time period (e.g., 500 msec intervals) until the shift is completed. For normal up or down shifting, the transmission display will not appear to shift to the driver because one cycle of the flash interval corresponds roughly to the average time that the automated mechanical transmission system takes to complete a shift. When a driver makes a shift request for activation of the shift lever, the message center only displays the selected gear if it is currently available. The message center informs the driver that the selected gear has been engaged by ceasing the flashing of the selected gear.

When a driver selects a gear or mode that is unavailable via the shift lever, the ICU generates an auditory tone indicating that it is unavailable. In the current implementation, for example, the ICU generates a pure square wave tone at 250 Hz for 300 msec. This particular tone was selected because it is not easily masked in the cabin environment and is used with other systems to represent an action that is inappropriate, not allowed, or requires different input. The same tone is used to signal an unavailable mode selection (e.g., moving the mode switch to reverse at highway speed). Instead of a single tone, the ICU repeats this tone at periodic intervals until the selector has been put back into the appropriate position. In addition, the message center generates a level 2 warning message with the corresponding auditory tone and display protocol.

CONCLUSION

While the invention is described with reference to a specific implementation, it is important to emphasize that the invention is not limited to the specific design details of this implementation. The message display integrates message displays from a variety of different types and models of ECUs and other sensors onboard the vehicle. The format of the data does not have to be in the form of serial data from a serial data link as in a system built for a J1708 data link. Instead, the data can be obtained from another type of data bus or through discrete wiring.

The software implementation can vary as well. The precise logic used to prioritize messages can vary.

Having described and illustrated the principles of our invention with reference to a specific implementation and possible alternatives, it should be apparent that the invention can be modified in arrangement and detail without departing from its principles. Accordingly, we claim all modifications as may come within the scope and spirit of the following claims.

We claim:

1. An integrated message system for a vehicle comprising:
   two or more electronic control units detecting vehicle operating conditions requiring action;
   an instrumentation control unit in communication with the one or more electronic control units, the instrumentation control unit including a visual display for displaying displayable vehicle messages and an audio transducer for generating auditory signals;
   wherein the instrumentation control unit displays a default screen and selectively overrides the default screen with prioritized displayable vehicle messages in response to detection of predetermined vehicle operating conditions via the electronic control units;

wherein the displayable vehicle messages indicate the vehicle operating conditions requiring action have been detected; and wherein the prioritized displayable vehicle messages overriding the default screen are organized into levels of importance such that displayable vehicle messages from a more important level override displayable vehicle messages from a less important level, a more important level indicates a more serious condition, when more than one displayable vehicle message is activated to override the default screen, conflicts are resolved based on the priority of the displayable vehicle messages, and each level of importance is associated with a different visual display protocol and a different corresponding auditory signal.

2. The system of claim 1 wherein each visual display protocol defines a predetermined display duration and repeat cycle defining when and how long the visual display associated with a prioritized message overrides the default screen.

3. The system of claim 1 wherein the instrumentation control unit is in communication with an input device that enables an operator to acknowledge a prioritized message, and the instrumentation control unit modifies the prioritized message to indicate that the message has been acknowledged.

4. The system of claim 1 wherein the instrumentation control unit displays a visual message indicating the importance level of a prioritized message along with descriptive text describing event specific information about the event that triggered the message for each of the prioritized messages.

5. The system of claim 1 wherein the default screen is driver selectable via an input device in communication with the instrumentation control unit.

6. The system of claim 1 wherein the default screen displays operating information about the vehicle including a fuel economy indicator, or an odometer reading.

7. The system of claim 1 wherein each level of prioritized message is associated with a different auditory tone indicating relative importance of the level relative to the other levels of messages.

8. An integrated message system for a vehicle comprising:
two or more electronic control units;
an instrumentation control unit in communication with the one or more electronic control units, the instrumentation control unit including a visual display for displaying displayable vehicle messages and an audio transducer for generating auditory signals;
wherein the instrumentation control unit displays a default screen and selectively overrides the default screen with prioritized displayable vehicle messages in response to predetermined events detected in the electronic control units;
wherein the displayable vehicle messages indicate vehicle operating conditions requiring action, provide alerts for the vehicle operating conditions without user intervention, and are associated with the predetermined events detected in the electronic control units;
wherein the prioritized displayable vehicle messages overriding the default screen are organized into levels of importance such that displayable vehicle messages from a more important level override displayable vehicle messages from a less important level, a more important level indicates a more serious condition of the vehicle, and each level of importance is associated with a different visual display protocol and a different corresponding auditory signal;

wherein each level of prioritized message is associated with a different auditory tone indicating relative importance of the level relative to the other levels of messages; and wherein each level is associated with a different number of beeping tones indicating relative importance of the level relative to the other levels.

9. The system of claim 1 wherein each level is associated with a different visual coding for flashing the corresponding visual display to indicate relative importance of the level relative to other levels.

10. An integrated message system for a vehicle comprising:
two or more electronic control units detecting vehicle operating conditions requiring action;
an instrumentation control unit in communication with the one or more electronic control units, the instrumentation control unit including a visual display for displaying displayable vehicle messages and an audio transducer for generating auditory signals;
a collision warning electronic control unit, wherein the collision warning electronic control unit communicates collision detection events to the instrumentation control unit and the collision detection events are associated with the different levels of prioritized messages overriding the default screen depending on relative importance of each collision detection event;
wherein the instrumentation control unit displays a default screen and selectively overrides the default screen with prioritized displayable vehicle messages in response to predetermined operating conditions detected via the electronic control units;
wherein the displayable vehicle messages indicate the vehicle operating conditions requiring action have occurred; and
wherein the prioritized displayable vehicle messages overriding the default screen are organized into levels of importance such that displayable vehicle messages from a more important level override displayable vehicle messages from a less important level, a more important level indicates a more serious condition, when more than one displayable vehicle message is activated to override the default screen, arbitration resolves conflicts among messages of different priority overriding the default screen according to the levels of the messages, and each level of importance is associated with a different visual display protocol and a different corresponding auditory signal.

11. The system of claim 10 wherein collision detection events are associated with a subset of the levels, and each level in the subset is associated with a different visual display that indicates relative importance of a collision warning with respect to the other levels.

12. The system of claim 11 wherein the visual display for each level of collision warning is associated with a displayed graphical warning symbol that grows progressively larger to reflect progressively more dangerous collision warning conditions.

13. The system of claim 1 including an electronic control unit for controlling adaptive cruise control, and the instrumentation control unit displays visual messages associated with adaptive cruise control events.

14. The system of claim 13 wherein adaptive cruise control events are associated with different levels of prioritized messages depending on relative importance of each adaptive cruise control event.

15. The system of claim 14 wherein the adaptive cruise control events include an operator input for setting a headway parameter.

16. The system of claim 14 wherein the adaptive cruise control events include an operator input for setting a vehicle set speed parameter.

17. The system of claim 1 including a transmission electronic control unit, and the instrumentation control unit displays visual messages indicating a selected gear.

18. The system of claim 17 wherein the instrumentation control unit displays visual messages indicating a selected driving mode.

19. A method for providing an integrated audio-visual message system for a vehicle comprising:

receiving messages regarding predetermined events detected in one or more electronic control units;

displaying a default screen and selectively overriding the default screen with prioritized displayable messages in response to predetermined events detected in the electronic control units;

wherein the displayable messages indicate vehicle operating conditions requiring action, provide alerts for the vehicle operating conditions without user intervention, and are associated with the predetermined events detected in the electronic control units; and wherein the prioritized displayable messages overriding the default screen are organized into levels of importance such that displayable messages from a more important level override alerts from a less important level, a more important level indicates a more serious condition of the vehicle, arbitration resolves conflicts among messages overriding the default screen according to the levels of the messages, and each level is associated with a different visual display protocol and a different corresponding auditory message.

20. An integrated audio-visual message system for a vehicle comprising:

two or more electronic control units;

an instrumentation control unit in communication with the two or more electronic control units, the instrumentation control unit including a visual display for displaying alphanumeric alerts and an audio transducer for generating auditory alerts;

wherein the instrumentation control unit displays a default screen and selectively overrides the default screen with prioritized alphanumeric alerts in response to predetermined events detected in the electronic control units;

wherein the displayable alphanumeric alerts indicate vehicle operating conditions requiring action, provide information relating to the vehicle operating conditions without user intervention, and are associated with the predetermined events detected in the electronic control units; and wherein the prioritized alphanumeric alerts overriding the default screen are organized into levels of importance such that alphanumeric alerts from a more important level override alerts from a less important level, when more than one prioritized alphanumeric alert is activated to override the default screen, conflicts are resolved based on the priorities of the prioritized alphanumeric alerts, a more important level indicates a more serious condition of the vehicle, and each level is associated with a different visual display protocol and a different corresponding auditory alert.

21. A method for presenting messages on a display unit in a vehicle, the method comprising:

displaying a default message on the display unit;

responsive to detecting vehicle operating conditions, activating at least two out of a plurality of overriding messages indicating different detected vehicle operating conditions, wherein the overriding messages are prioritized in a multi-level priority scheme; and when a plurality of overriding messages have been activated, resolving conflicts between the overriding messages via the priority levels of the overriding messages to display only the overriding message with the highest priority level.

22. The method of claim 21 wherein each priority level is associated with a different number of beeping tones indicating relative importance of the level relative to the other levels.

* * * * *

UNITED STATES PATENT AND TRADEMARK OFFICE
CERTIFICATE OF CORRECTION

PATENT NO. : 6,289,332 B2  Page 1 of 1
DATED : September 11, 2001
INVENTOR(S) : Paul M. Menig et al.

It is certified that error appears in the above-identified patent and that said Letters Patent is hereby corrected as shown below:

Column 1,
Line 8, "Kim" should read -- Kirn --

Signed and Sealed this

Ninth Day of September, 2003

JAMES E. ROGAN
*Director of the United States Patent and Trademark Office*